United States Patent
Suzuki

(10) Patent No.: US 9,116,653 B2
(45) Date of Patent: *Aug. 25, 2015

(54) TERMINAL APPARATUS AND SCANNER INTERACTING TO PERFORM SCAN FUNCTIONS USING DIFFERENT COMMUNICATION SCHEMES

(71) Applicant: Takanobu Suzuki, Nagoya (JP)

(72) Inventor: Takanobu Suzuki, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/191,513

(22) Filed: Feb. 27, 2014

(65) Prior Publication Data

US 2014/0240775 A1    Aug. 28, 2014

(30) Foreign Application Priority Data

Feb. 28, 2013 (JP) ................ 2013-040087

(51) Int. Cl.
*G06F 3/12* (2006.01)
*H04B 5/00* (2006.01)
(Continued)

(52) U.S. Cl.
CPC .......... *G06F 3/1292* (2013.01); *H04N 1/00217* (2013.01); *H04N 1/00225* (2013.01);
(Continued)

(58) Field of Classification Search
CPC .......... H04N 1/00225; H04N 1/00244; H04N 1/00307; H04N 1/00408; H04N 1/00413; H04N 1/00416; H04N 1/00421; H04N 1/00432; H04N 1/00474; H04N 1/00973; H04N 2201/0036; H04N 2201/0039; H04N 2201/0041; H04N 2201/0044; H04N 2201/0055; H04N 2201/0096; H04N 1/00103; H04N 1/0024; H04N 1/00915; H04N 2201/0048; H04N 2201/007; H04W 4/00; H04W 4/02; H04W 16/14; H04W 48/18; H04W 84/12; H04W 4/008; H04W 76/0022; G06F 3/1204; G06F 3/1236; G06F 3/1287; G06F 3/1292; H04M 1/7253; H04M 2250/02; H04M 2250/04; H04M 2250/06
USPC ............. 358/1.15; 455/41.2, 67.11, 450; 370/338, 445
See application file for complete search history.

(56) References Cited

U.S. PATENT DOCUMENTS 6,636,738 B1 * 10/2003 Hayashi ............... 455/450
8,159,706 B2   4/2012 Kato
(Continued)

FOREIGN PATENT DOCUMENTS

JP  2007-096445 A   4/2007
JP  2007-166538 A   6/2007
(Continued)

OTHER PUBLICATIONS

Co-pending U.S. Appl. No. 14/191,474, filed Feb. 27, 2014.
(Continued)

*Primary Examiner* — Benny Q Tieu
*Assistant Examiner* — Juan M Guillermety
(74) *Attorney, Agent, or Firm* — Banner & Witcoff, Ltd.

(57) ABSTRACT

A terminal apparatus may receive first information relating to a first function executing apparatus from the first function executing apparatus. The first function executing apparatus may be configured to execute a scan function. The terminal apparatus may select, by using the first information, a particular communication scheme from among M1 items of communication schemes in a case where the first information is received. Each of the M1 items of communication schemes may be different from each other and may be a communication scheme available for the first function executing apparatus to send scan data. The terminal apparatus may send a first selection result indicating the particular communication scheme to the first function executing apparatus in a case where the particular communication scheme is selected from among the M1 items of communication schemes.

8 Claims, 19 Drawing Sheets

(51) Int. Cl.
*H04B 1/18* (2006.01)
*H04N 1/00* (2006.01)
*H04W 4/00* (2009.01)

(52) U.S. Cl.
CPC ....... *H04N1/00241* (2013.01); *H04N 1/00307* (2013.01); *H04N 2201/006* (2013.01); *H04N 2201/0055* (2013.01); *H04N 2201/0094* (2013.01); *H04W 4/008* (2013.01)

(56) References Cited

U.S. PATENT DOCUMENTS

| | | | |
|---|---|---|---|
| 8,189,225 B1 * | 5/2012 | Lo et al. | 358/1.15 |
| 8,625,488 B1 * | 1/2014 | Gogate et al. | 370/328 |
| 8,665,480 B2 | 3/2014 | Wada et al. | |
| 2002/0051197 A1 | 5/2002 | Minegishi | |
| 2007/0041036 A1 | 2/2007 | Nakayama | |
| 2007/0280122 A1 | 12/2007 | Ito | |
| 2009/0092106 A1 | 4/2009 | Nakayama | |
| 2010/0081385 A1 | 4/2010 | Lin et al. | |
| 2010/0149602 A1 * | 6/2010 | Tamai et al. | 358/403 |
| 2011/0170686 A1 | 7/2011 | Goto | |
| 2011/0177780 A1 | 7/2011 | Sato et al. | |
| 2011/0317211 A1 * | 12/2011 | Yamada et al. | 358/1.15 |
| 2012/0081745 A1 | 4/2012 | Asai | |
| 2012/0236358 A1 * | 9/2012 | Huang | 358/1.15 |
| 2013/0229673 A1 * | 9/2013 | Nakayama et al. | 358/1.13 |
| 2013/0250354 A1 * | 9/2013 | Kato et al. | 358/1.15 |
| 2014/0366101 A1 * | 12/2014 | Murata | 726/4 |

FOREIGN PATENT DOCUMENTS

| | | | |
|---|---|---|---|
| JP | 2011-146991 A | | 7/2011 |
| JP | PCT/2013/051952 | * | 1/2013 |

OTHER PUBLICATIONS

Co-pending U.S. Appl. No. 14/191,476, filed Feb. 27, 2014.
Co-pending U.S. Appl. No. 14/191,510, filed Feb. 27, 2014.
Jul. 30, 2014—(US) Non-Final Office Action—U.S. Appl. No. 14/191,474.
Jul. 30, 2014—(US) Non-Final Office Action—U.S. Appl. No. 14/191,476.
Aug. 19, 2014—(US) Non-Final Office Action—U.S. Appl. No. 14/191,510.
Jul. 24, 2014—(EP) Extended Search Report—App 14157087.9.

* cited by examiner (Scan Function Which MFP is Capable of Executing)

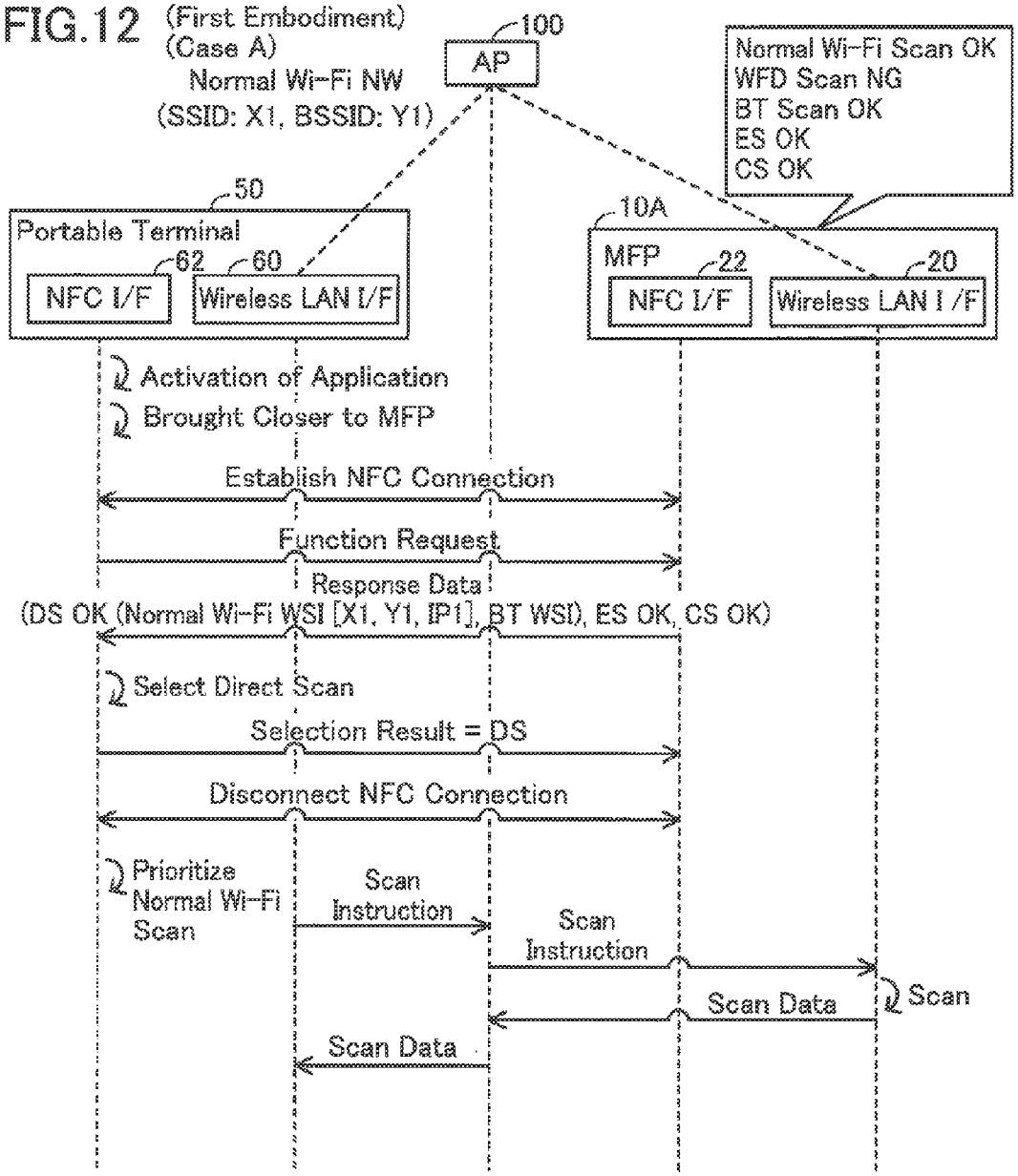

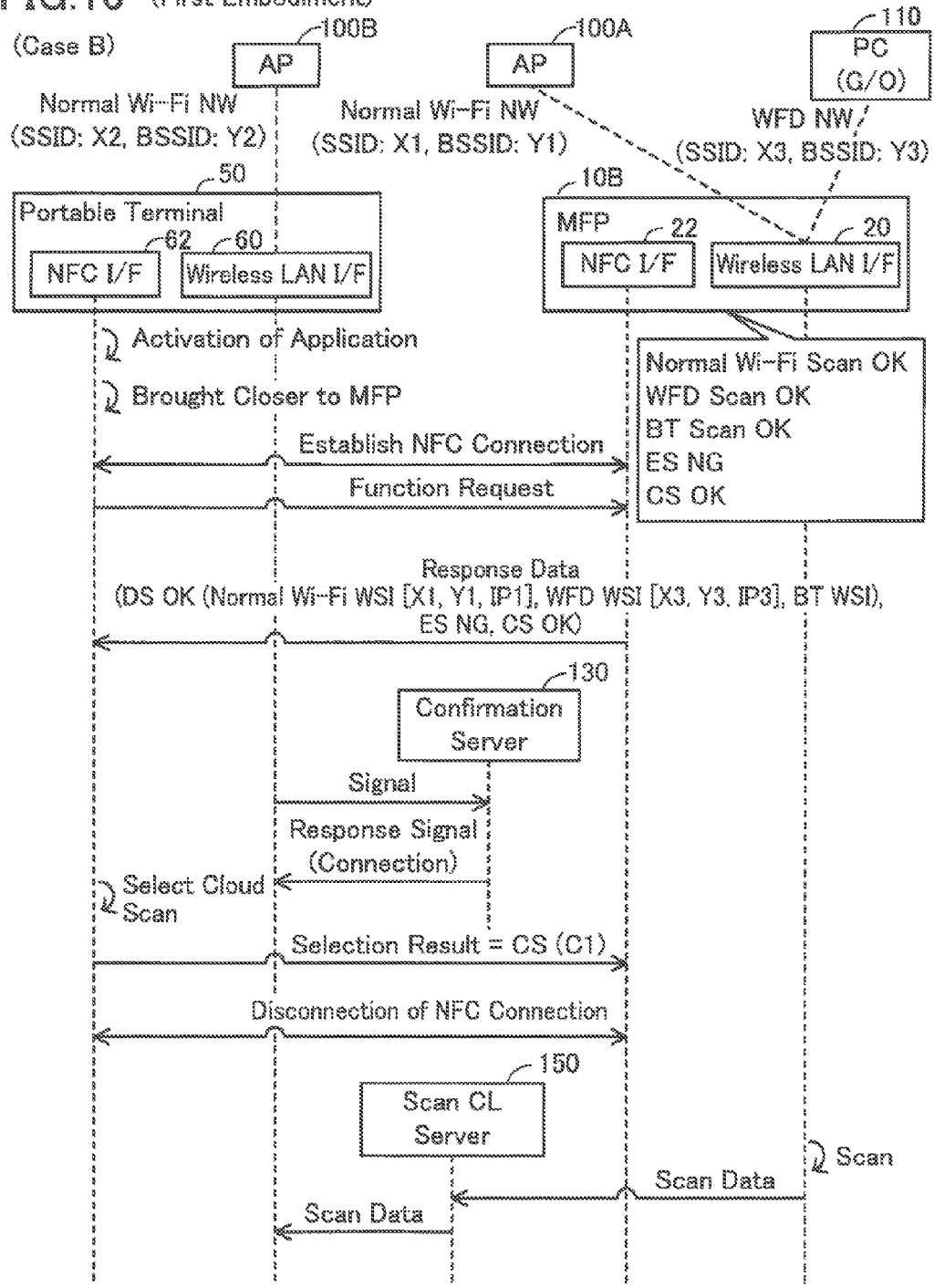

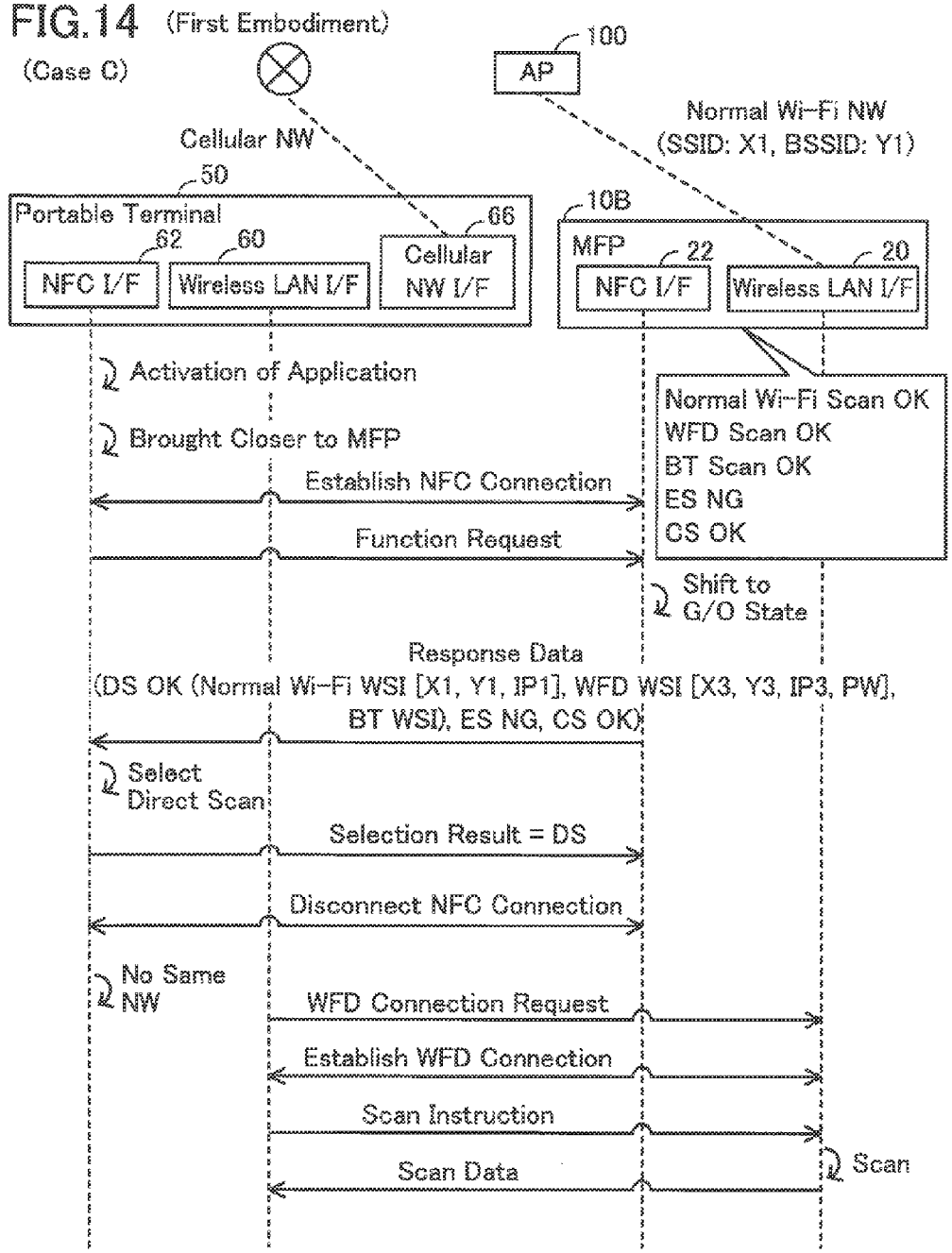

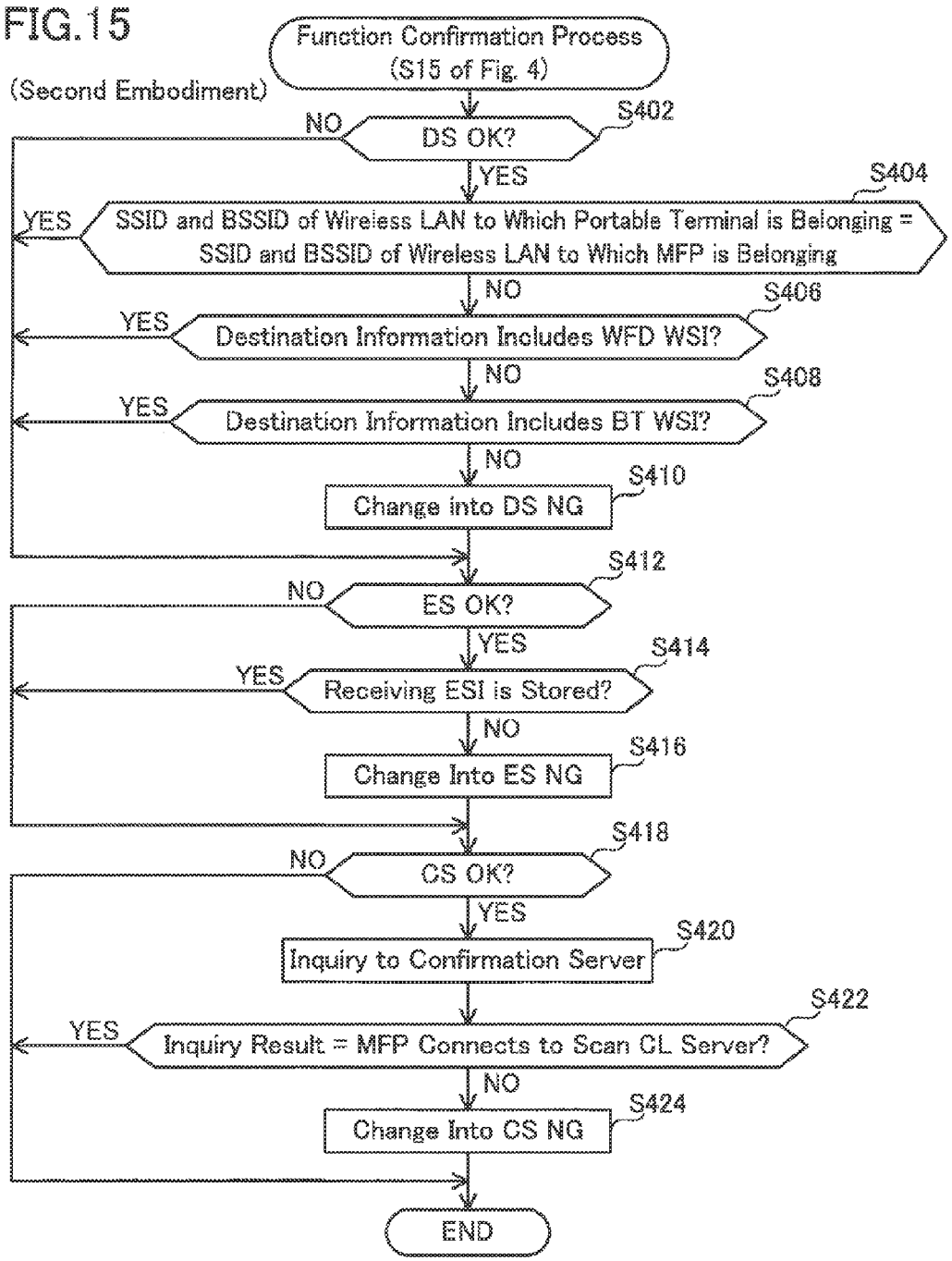

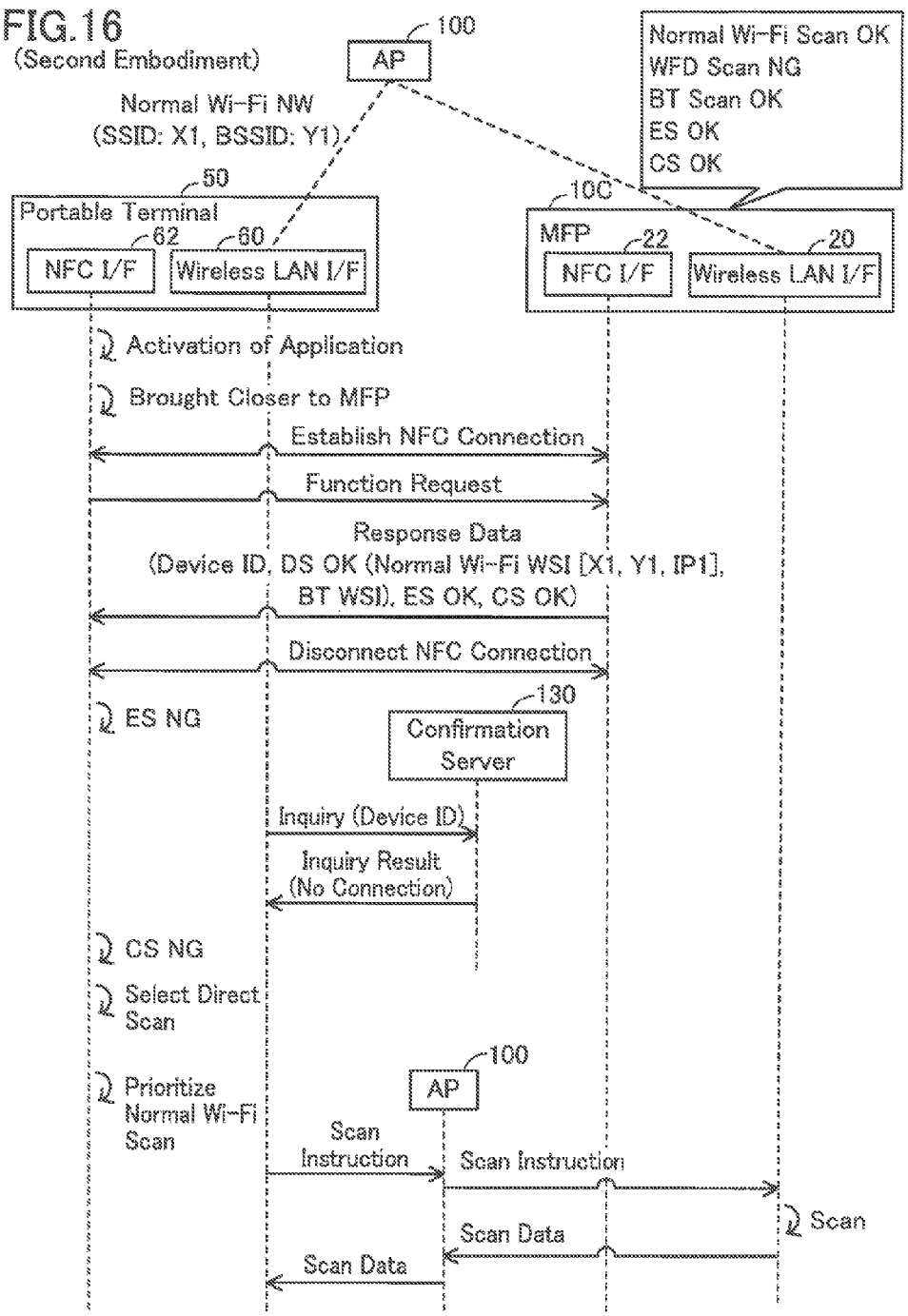

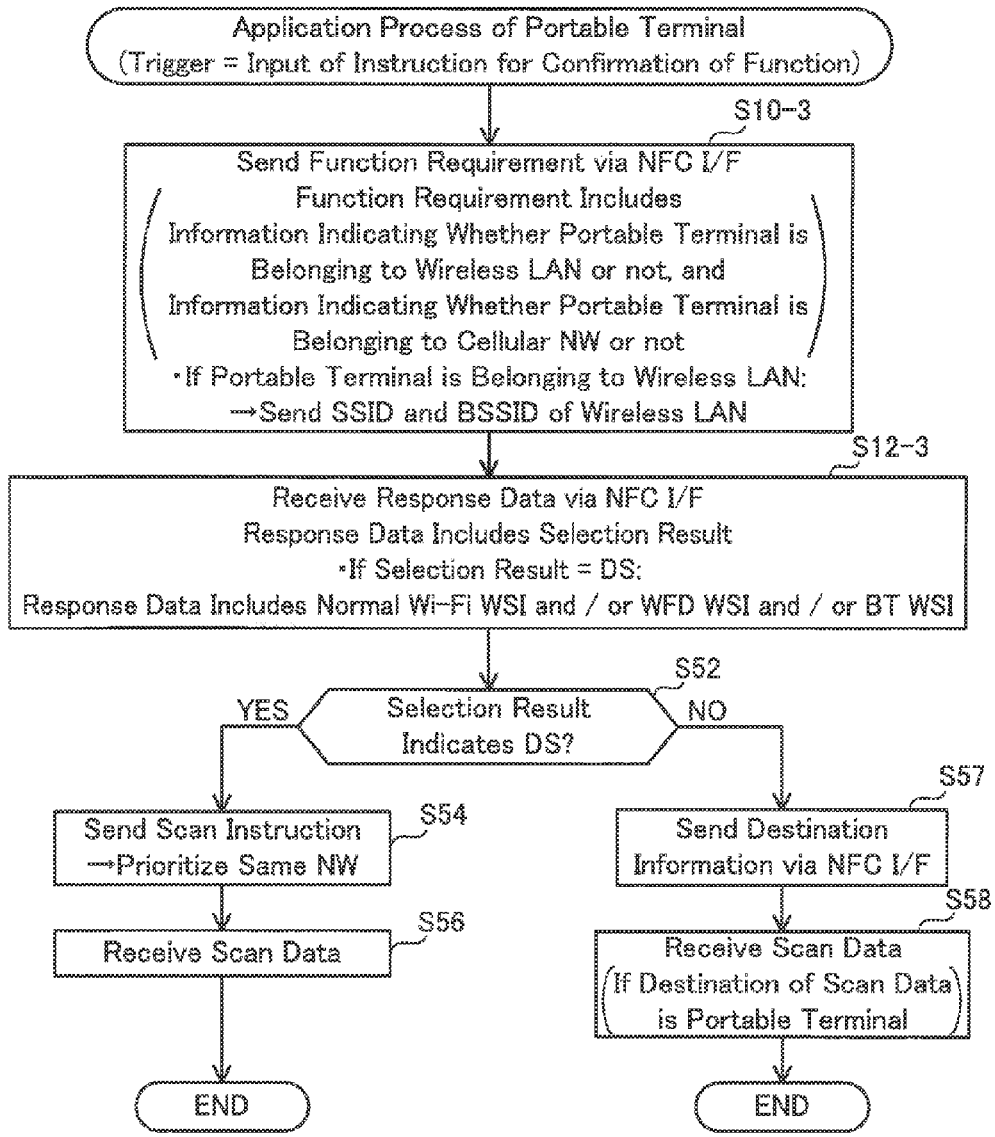

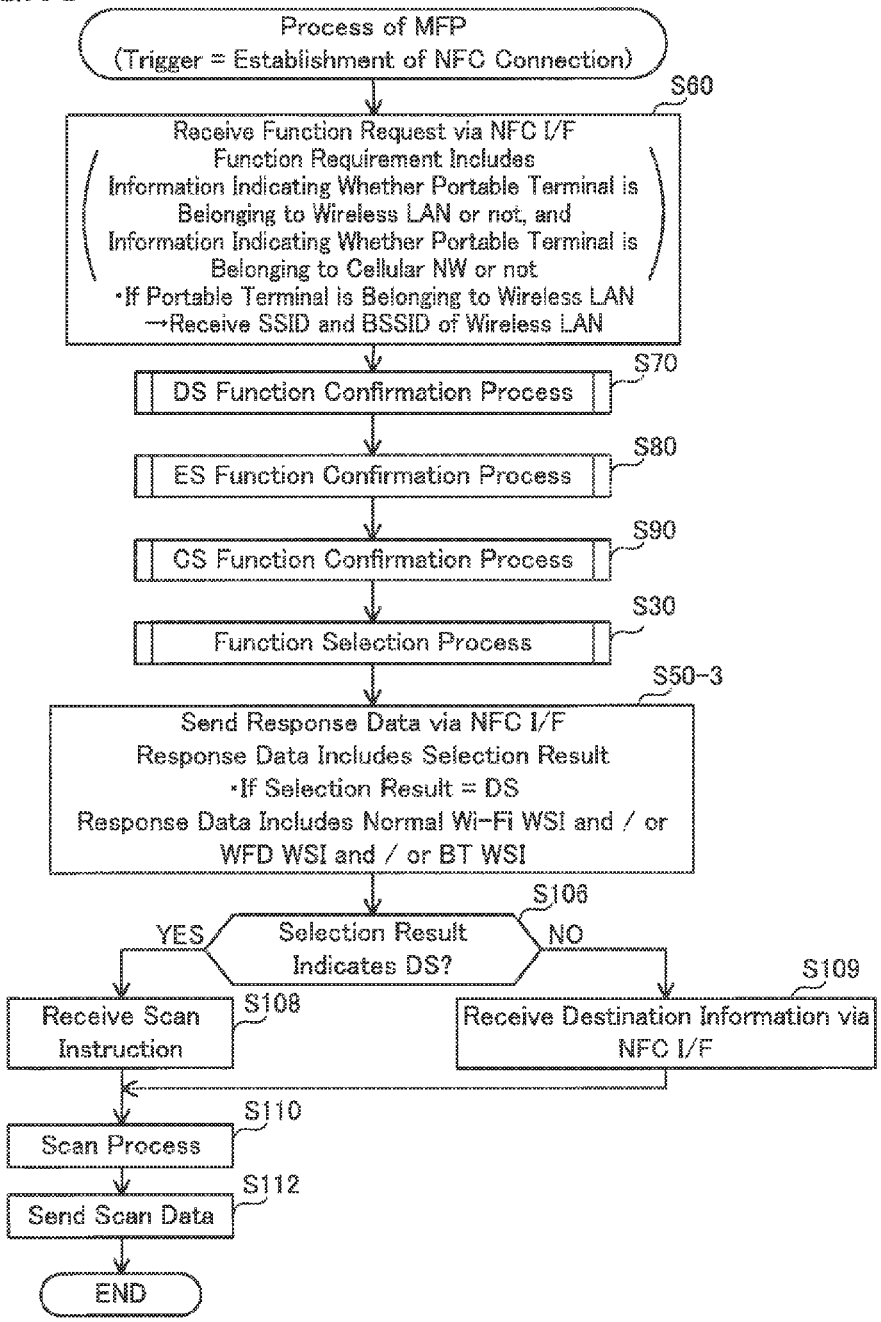

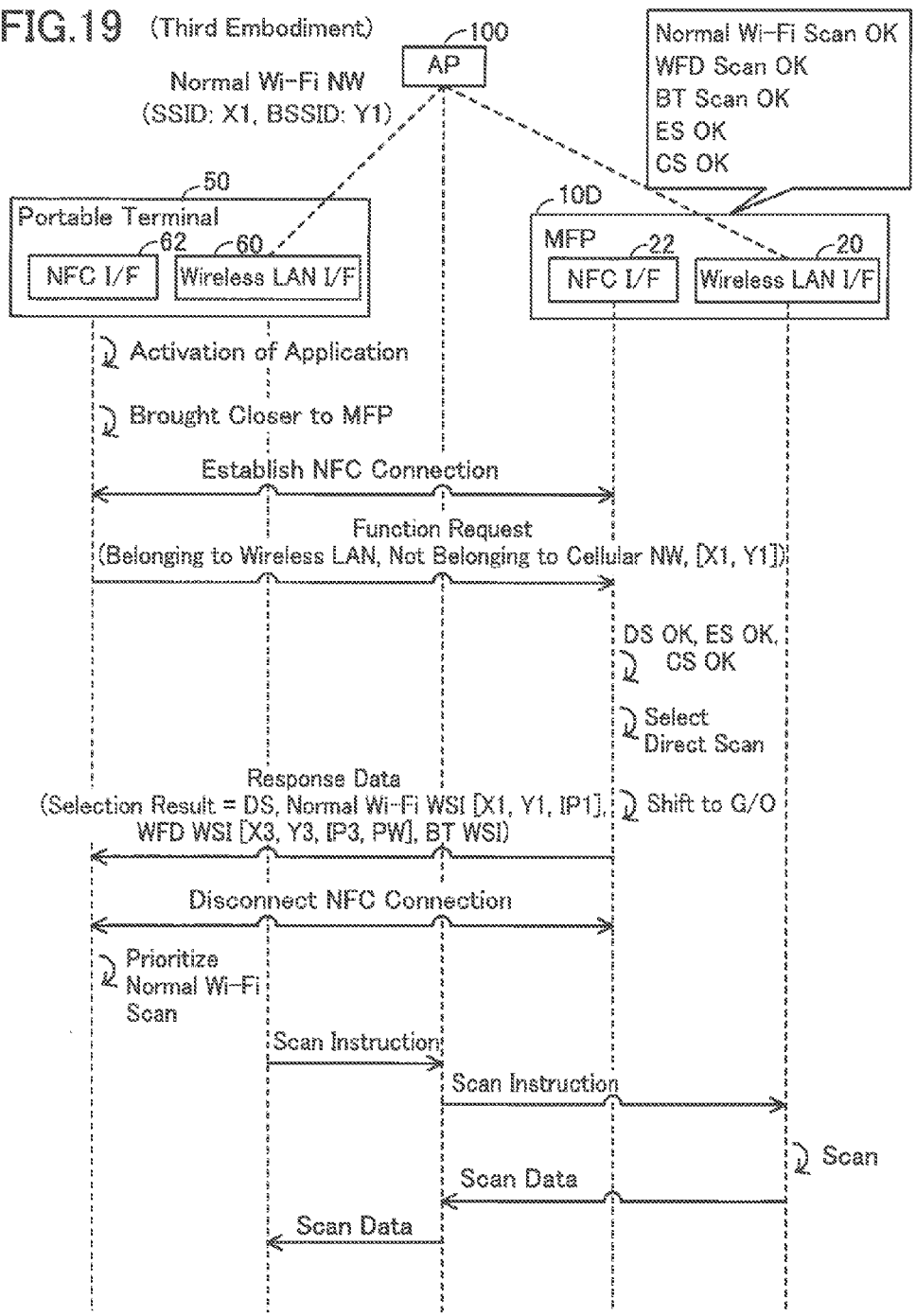

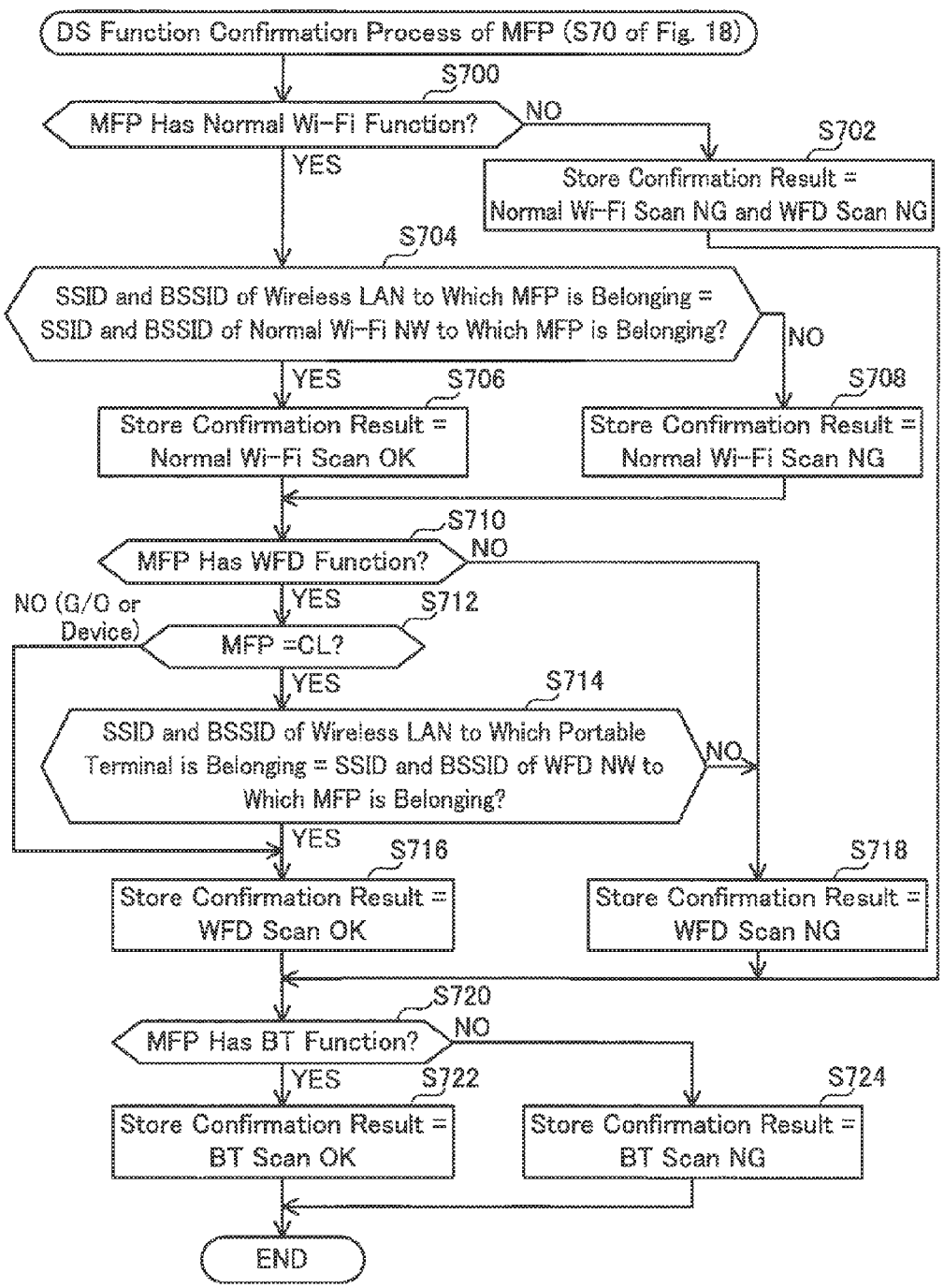

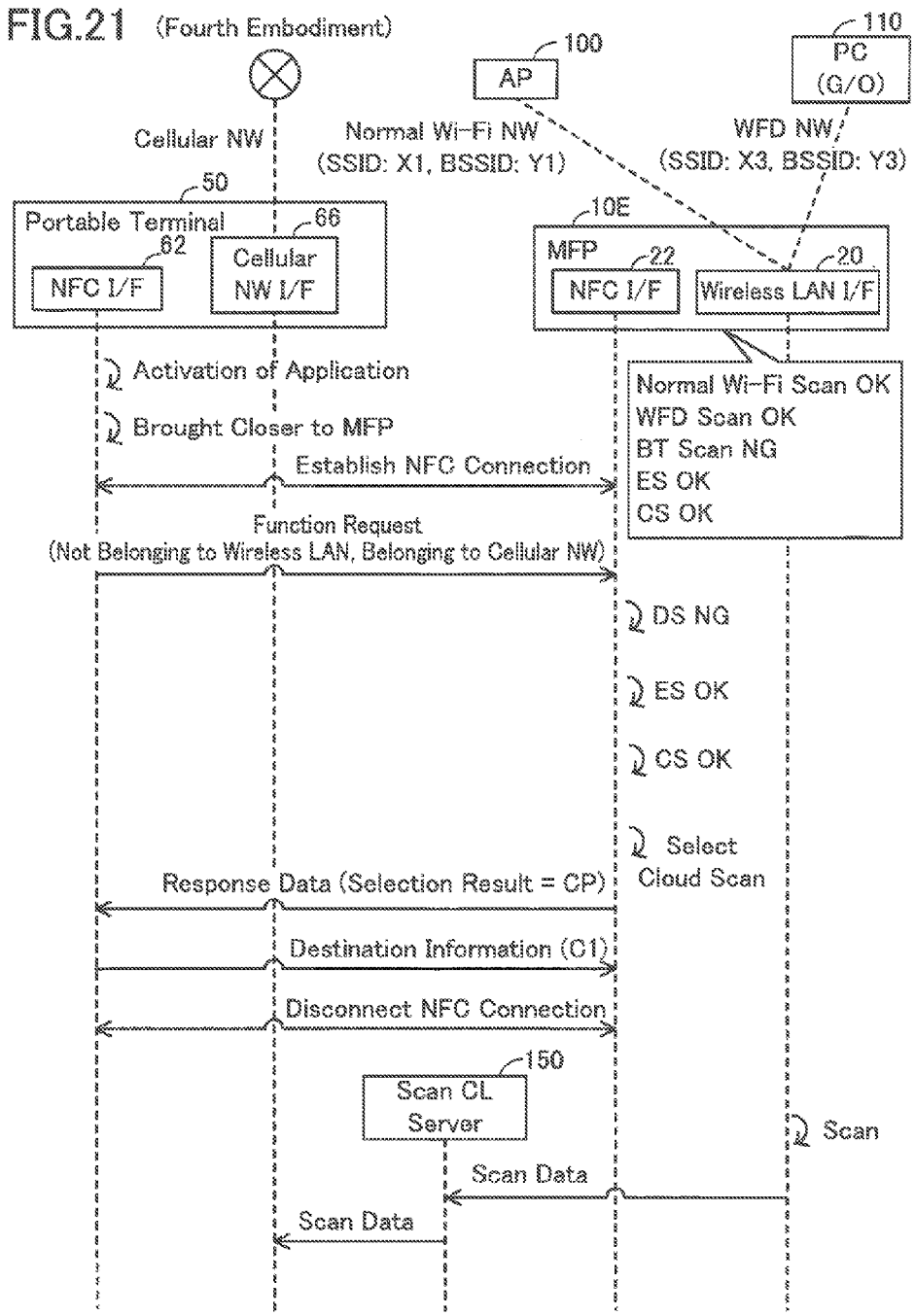

TERMINAL APPARATUS AND SCANNER INTERACTING TO PERFORM SCAN FUNCTIONS USING DIFFERENT COMMUNICATION SCHEMES

CROSS-REFERENCE TO RELATED APPLICATIONS

This application claims priority to Japanese Patent Application No. 2013-040087, filed on Feb. 28, 2013, the contents of which are hereby incorporated by reference into the present application.

TECHNICAL FIELD

The present specification discloses a function executing apparatus capable of executing a scan function, and a terminal apparatus capable of communicating with the function executing apparatus.

TECHNICAL FIELD

A telephone system provided with a plurality of wireless telephones and a telephone control apparatus is known. Upon detecting a channel number which a wireless LAN base station has started to use, the telephone control apparatus notifies the each wireless telephone of the channel number. The each wireless telephone uses the notified channel number.

SUMMARY

In the present specification, a technique is presented for a function executing apparatus to appropriately execute sending of scan data.

One aspect disclosed in the present specification may be a terminal apparatus. The terminal apparatus may comprise: a processor; and a memory storing computer-readable instructions therein. The computer-readable instructions, when executed by the processor, may cause the terminal apparatus to perform: receiving first information relating to a first function executing apparatus from the first function executing apparatus, the first function executing apparatus being configured to execute a scan function; selecting, by using the first information, a particular communication scheme from among M1 items of communication schemes in a case where the first information is received, the M1 being an integer of two or more, each of the M1 items of communication schemes being different from each other and being a communication scheme available for the first function executing apparatus to send scan data; and sending a first selection result indicating the particular communication scheme to the first function executing apparatus in a case where the particular communication scheme is selected from among the M1 items of communication schemes.

One aspect disclosed in the present specification is a function executing apparatus configured to execute a scan function. The function executing apparatus may comprise: a processor; and a memory storing computer-readable instructions therein. The computer-readable instructions, when executed by the processor, may cause the function executing apparatus to perform: receiving an instruction for an execution of the scan function from a terminal apparatus; selecting a particular communication scheme from among M1 items of communication schemes in a case where the instruction is received by the terminal apparatus, the M1 being an integer of two or more, each of the M1 items of communication schemes being different from each other and being a communication scheme available for the function executing apparatus to send scan data; and sending particular scan data to the terminal apparatus in accordance with the particular communication scheme.

Moreover, a control method, a computer program, and a non-transitory computer-readable recording medium that stores the computer program, all for realizing the terminal device and the function executing apparatus respectively, are also novel and useful. Further, a communication system comprising the terminal apparatus and the function executing apparatus is also novel and useful.

BRIEF DESCRIPTION OF THE DRAWINGS

FIG. 12 shows a sequence view of case A of the first embodiment.
FIG. 13 shows a sequence view of case B of the first embodiment.
FIG. 14 shows a sequence view of case C of the first embodiment.
FIG. 15 shows a flowchart of a function confirmation process of the second embodiment.
FIG. 16 shows a sequence view of processes executed by devices of the second embodiment.
FIG. 17 shows a flowchart of an application process of a portable terminal of a third embodiment.
FIG. 18 shows a flowchart of a process of an MFP of the third embodiment.
FIG. 19 shows a sequence view of processes executed by devices of the third embodiment.
FIG. 20 shows a flowchart of a DS function confirmation process of a fourth embodiment.
FIG. 21 shows a sequence view of processes executed by devices of the fourth embodiment.

Figure 1:
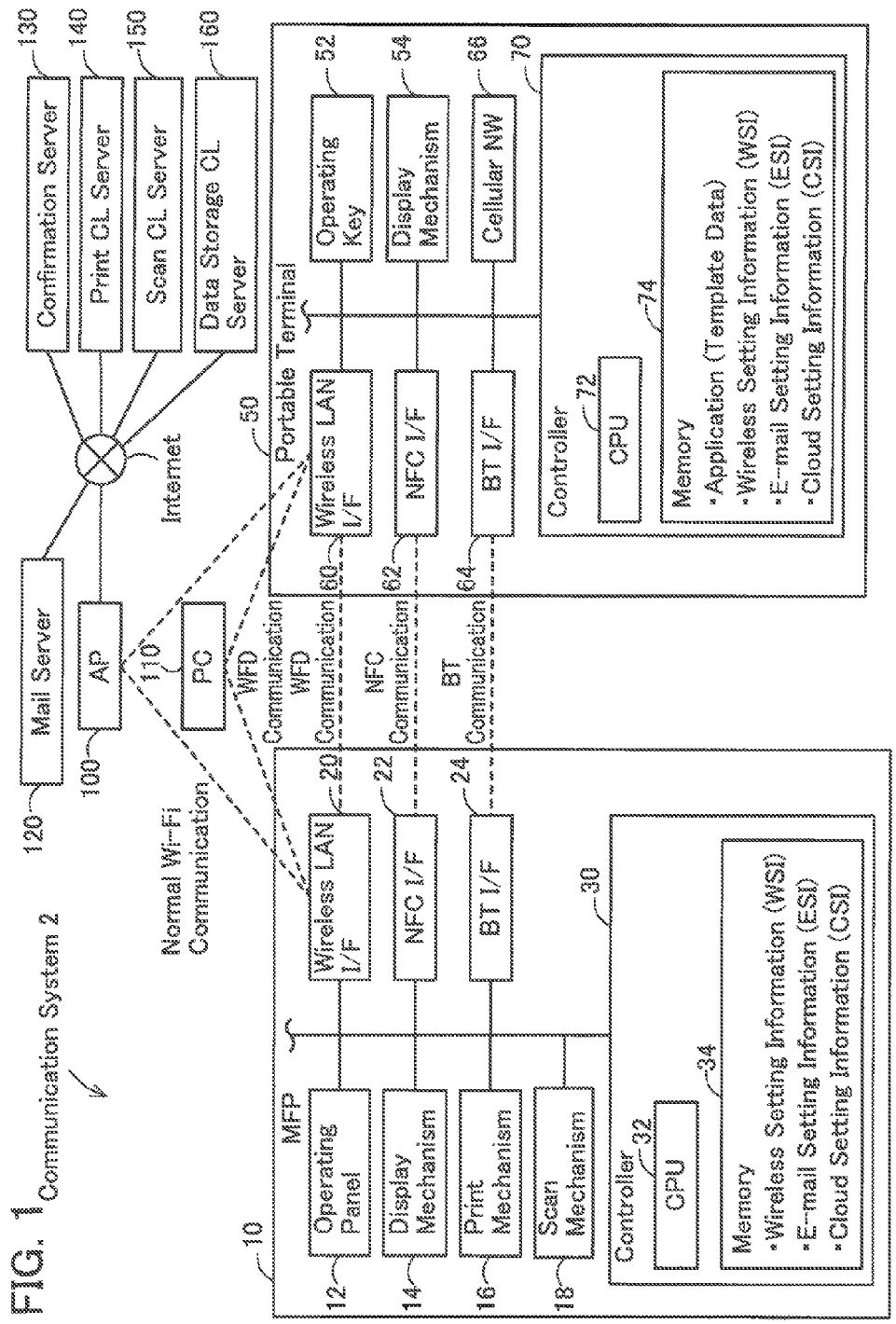
FIG. 1 shows the structure of a communication system.

EMBODIMENT (First Embodiment)
(Structure of Communication System 2)
As shown in FIG. 1, a communication system 2 comprises a multi-function peripheral (called "MFP (abbreviation of Multi-Function Peripheral)" below) 10, a portable terminal 50, an access point (called "AP (abbreviation of Access Point)" below) 100, a PC (abbreviation of Personal Computer) 110, a mail server 120, a confirmation server 130, a print CL server 140, a scan CL server 150, and a data storage CL server 160.
(Structure of MFP 10)
The MFP 10 is a peripheral device (e.g., a peripheral device of the PC 110) capable of executing multiple functions including a print function and a scan function. The MFP 10 comprises an operating panel 12, a display mechanism 14, a print mechanism 16, a scan mechanism 18, a wireless LAN (abbreviation of Local Area Network) interface 20, an NFC (abbreviation of Near Field Communication) interface 22, a BT (abbreviation of Blue Tooth (registered trademark)) interface 24, and a controller 30. The units 12 to 30 are connected with a bus line (reference number omitted). Below, interface is referred to as "I/F".

The operating panel 12 comprises a plurality of keys. A user can give various instructions to the MFP 10 by operating the operating panel 12. The display mechanism 14 is a display for showing various types of information. The print mechanism 16 is a print mechanism such as an ink jet method, laser method. The scan mechanism 18 is a scan mechanism such as a CCD or CIS.

The wireless LAN I/F 20 is an interface for executing a wireless communication, and is physically one interface (i.e., one IC chip). However, a MAC address (called "WFD MAC" below) used in wireless communication (called "WFD communication" below) according to a WFD (abbreviation of Wi-Fi Direct) scheme, and a MAC address (called "normal Wi-Fi MAC" below) used in wireless communication (called "normal Wi-Fi communication" below) according to a normal Wi-Fi scheme both be assigned to the wireless LAN I/F 20.

Specifically, a normal Wi-Fi MAC is assigned in advance to the wireless LAN I/F 20. By using the normal Wi-Fi MAC, the controller 30 generates a WFD MAC which is different from the normal Wi-Fi MAC, and assigns the WFD MAC to the wireless LAN I/F 20. Consequently, the controller 30 can simultaneously execute both a normal Wi-Fi communication using the normal Wi-Fi MAC, and a WFD communication using the WFD MAC. The WFD communication and the normal Wi-Fi communication will be described in detail later.

The NFC I/F 22 is an interface for executing NFC communication. NFC communication is a wireless communication according to an NFC scheme for so-called short distance wireless communication. The NFC scheme is a wireless communication scheme based on e.g., international standards ISO/IEC21481 or 18092.

The BT I/F 24 is an interface for executing BT communication. BT communication is a wireless communication according to a BT scheme for a so-called short distance wireless communication. The BT scheme is a wireless communication scheme based on e.g., standard IEEE802.15.1. A chip configuring the wireless LAN I/F 20, a chip configuring the NFC I/F 22, and a chip configuring the BT I/F 24 are physically different. Moreover, in the present embodiment, each of the three I/Fs are configured as different chips. However, in a variant, the wireless LAN I/F 20, the NFC I/F 22, and the BT I/F 24 may be configured as one chip, or two of the three I/Fs may be configured as one chip.

A communication speed (e.g., maximum communication speed is 11 to 600Mbps) of a wireless communication (i.e., normal Wi-Fi communication and WFD communication) using the wireless LAN I/F 20 is faster than a communication speed (e.g., maximum communication speed is 24 Mbps) of a wireless communication via the BT I/F 24 (i.e., BT communication). The communication speed of a wireless communication via the BT I/F 24 (i.e., BT communication) is faster than a communication speed (e.g., maximum communication speed is 100 to 424Kbps) using the NFC I/F 22. That is, the communication speed of the wireless communication is fastest for the wireless LAN I/F 20, second fastest for the BT I/F 24, and slowest for the NFC I/F 22.

Frequency of a carrier wave in a wireless communication via the wireless LAN I/F 20 is, e.g., 2.4GHz band or 5.0GHz band. Frequency of a carrier wave in a wireless communication via the NFC I/F 22 is, e.g., 13.56MHz band. Frequency of a carrier wave in a wireless communication via the BT I/F 24 is, e.g., 2.4GHz band. That is, the frequency of the carrier wave is different for the wireless LAN I/F 20 and the NFC I/F 22, and is different for the NFC I/F 22 and the BT I/F 24. Further, in a case where the frequency of the carrier wave of the wireless LAN I/F 20 is 5.0GHz band, the frequency of the carrier wave differs between the wireless LAN I/F 20 and the BT I/F 24.

A maximum distance (e.g., approximately 100m) across which the MFP 10 can execute a wireless communication with a communication destination device (e.g., the portable terminal 50) via the wireless LAN I/F 20 is greater than a maximum distance (e.g., approximately several tens of meters) across which the MFP 10 can execute a wireless communication with a communication destination device (e.g., the portable terminal 50) via the BT I/F 24. Further, a maximum distance (e.g., approximately several tens of meters) across which the MFP 10 can execute a wireless communication with a communication destination device (e.g., the portable terminal 50) via the BT I/F 24 is greater than a maximum distance (e.g., approximately 10cm) across which the MFP 10 can execute a wireless communication with a communication destination device via the NFC I/F 22. That is, the communicable range of the wireless communication is greatest for the wireless LAN I/F 20, second greatest for the BT I/F 24, and smallest for the NFC I/F 22.

The controller 30 comprises a CPU 32 and a memory 34. The CPU 32 executes various processes according to a program stored in the memory 34. Further, the memory 34 can store wireless setting information (called "WSI (abbreviation of Wireless Setting Information)" below) for the MFP 10 to execute various types of communication (i.e., WFD communication, normal Wi-Fi communication, BT communication), E-mail setting information (called "ESI (abbreviation of E-mail Setting Information)" below) for the MFP 10 to execute E-mail (abbreviation of Electronic Mail) communication, and cloud setting information (called "CSI (abbreviation of Cloud Setting Information)" below) for the MFP 10 to execute communication with a cloud server (called "cloud communication" below). Moreover, the E-mail communication or cloud communication may be executed via the wireless LAN I/F 20, or may be executed via another I/F, which is not shown (e.g., a wired LAN I/F, etc.).

(Structure of Portable Terminal 50)

The portable terminal 50 is a portable terminal apparatus such as a mobile phone (e.g., a Smart Phone), PDA, notebook PC, tablet PC, portable music playback device, portable video playback device, etc. The portable terminal 50 comprises an operating key 52, a display mechanism 54, a wireless LAN I/F 60, an NFC I/F 62, a BT I/F 64, a cellular NW (abbreviation of Network) I/F 66, and a controller 70. The units 52 to 70 are connected to a bus line (reference number omitted).

The user can give various instructions to the portable terminal 50 by operating the operating key 52. The display mechanism 54 is a display for displaying various types of information. The I/Fs 60, 62, 64 are the same as the I/Fs 20, 22, 24 of the MFP 10. Consequently, the differences between the I/Fs 60, 62, 64 are the same as the differences between the I/Fs 20, 22, 24.

The cellular NW I/F 66 is an interface for executing cellular communication. Cellular communication is a wireless communication according to a cellular scheme. The cellular scheme is a wireless communication scheme based on, e.g., International Standards for IMT (abbreviation of International Mobile Telecommunication) 2000, and is a so-called 3G, 4G, etc. wireless communication scheme.

The controller 70 comprises a CPU 72 and a memory 74. The CPU 72 executes various processes according to a program stored in the memory 74. The memory 74 stores an application (called "MFP application" below) for causing the MFP 10 to execute a function (e.g., print function, scan function, etc.). The MFP application may, e.g., be installed on the portable terminal 50 from a server provided by a vendor of the MFP 10, or may be installed on the portable terminal 50 from a media shipped together with the MFP 10.

Further, the memory 74 can store WSI for the portable terminal 50 to execute various types of communication (WFD communication, normal Wi-Fi communication, BT communication), ESI for the portable terminal 50 to execute E-mail communication, and CSI for the portable terminal 50 to execute cloud communication. Moreover, the E-mail communication or the cloud communication may be executed via the wireless LAN I/F 60, or via the cellular NW I/F 66.

(Structure of Other Apparatuses 100 to 160)

The AP 100 is a standard access point called a wireless access point, wireless LAN router, etc., and is different from a WFD scheme G/O device (to be described). The AP 100 can form a normal Wi-Fi network (to be described). The AP 100 comprises a router function that is connected to the Internet and that relays communication between the Internet and the normal Wi-Fi network formed by the AP 100. Moreover, below, a network may be described as "NW".

The PC 110 is a known computer that operates according to an OS program. The PC 110 can execute a WFD communication according to the WFD scheme.

The servers 120 to 160 are connected with the Internet. The mail server 120 includes an SMTP (abbreviation of Simple Mail Transfer Protocol) server, and a POP (abbreviation of Post Office Protocol) server. The mail server 120 relays the communication of electronic mail in a case where sending of electronic mail from one communication device (e.g., the portable terminal 50) to another communication device (e.g., the MFP 10) is to be executed.

The confirmation server 130, the print CL (abbreviation of Cloud) server 140, and the scan CL server 150 are each servers provided by e.g., the vendor of the MFP 10. The confirmation server 130 sends a response signal to the MFP 10 in case of receiving a signal from the MFP 10. Further, in case of receiving a signal from the portable terminal 50, the confirmation server 130 sends a response signal to the portable terminal 50. In a case where sending of print data from a communication device (e.g., the portable terminal 50) to the MFP 10 is to be executed, the print CL server 140 relays the communication of the print data. The scan CL server 150, in a case where sending of scan data from the MFP 10 to a communication device (e.g., the portable terminal 50) is to be executed, relays the communication of the scan data.

The data storage CL server 160 is a known server such as, e.g., FACEBOOK (registered trademark), (GOOGLE DOCS (registered trademark), PICASA (registered trademark), etc. The data storage CL server 160 receives scan data from the MFP 10, and stores the scan data.

Figure 2:
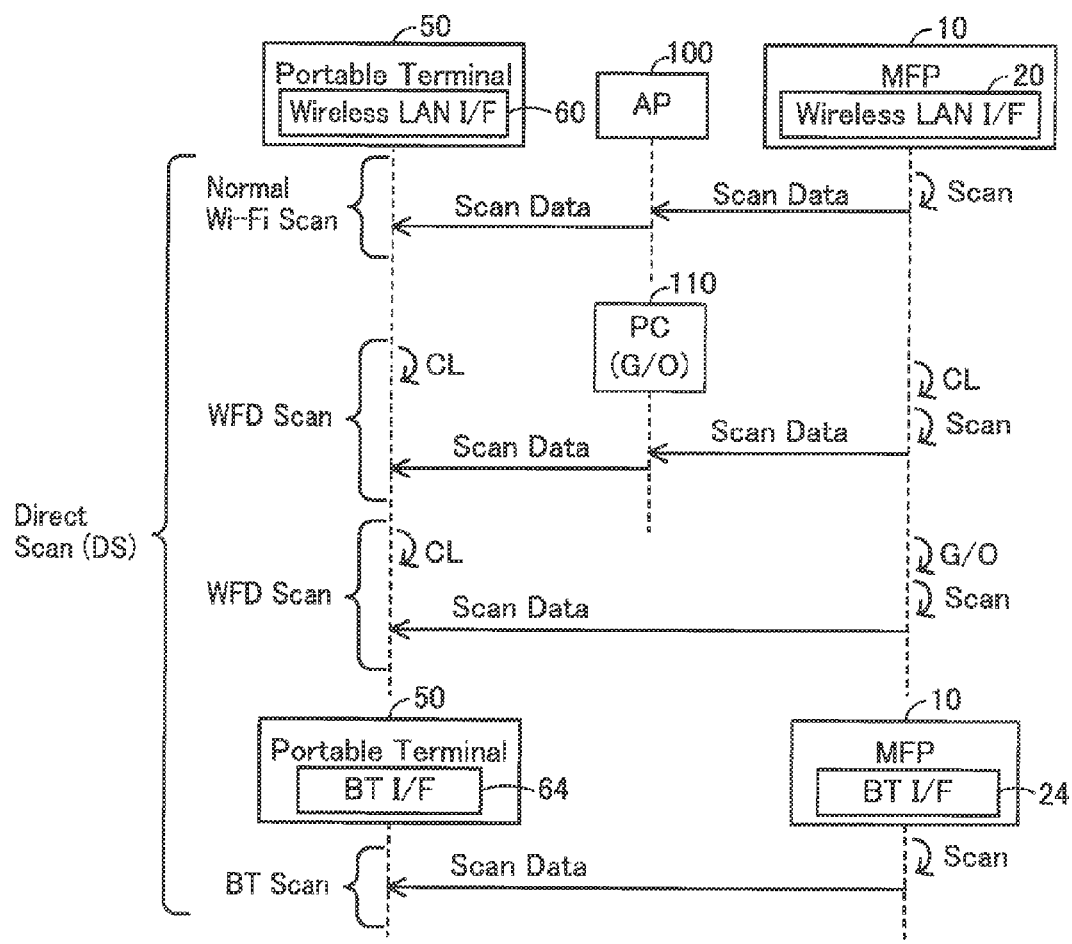
FIG. 2 shows a view for describing a scan function which an MFP is capable of executing.
Figure 3:
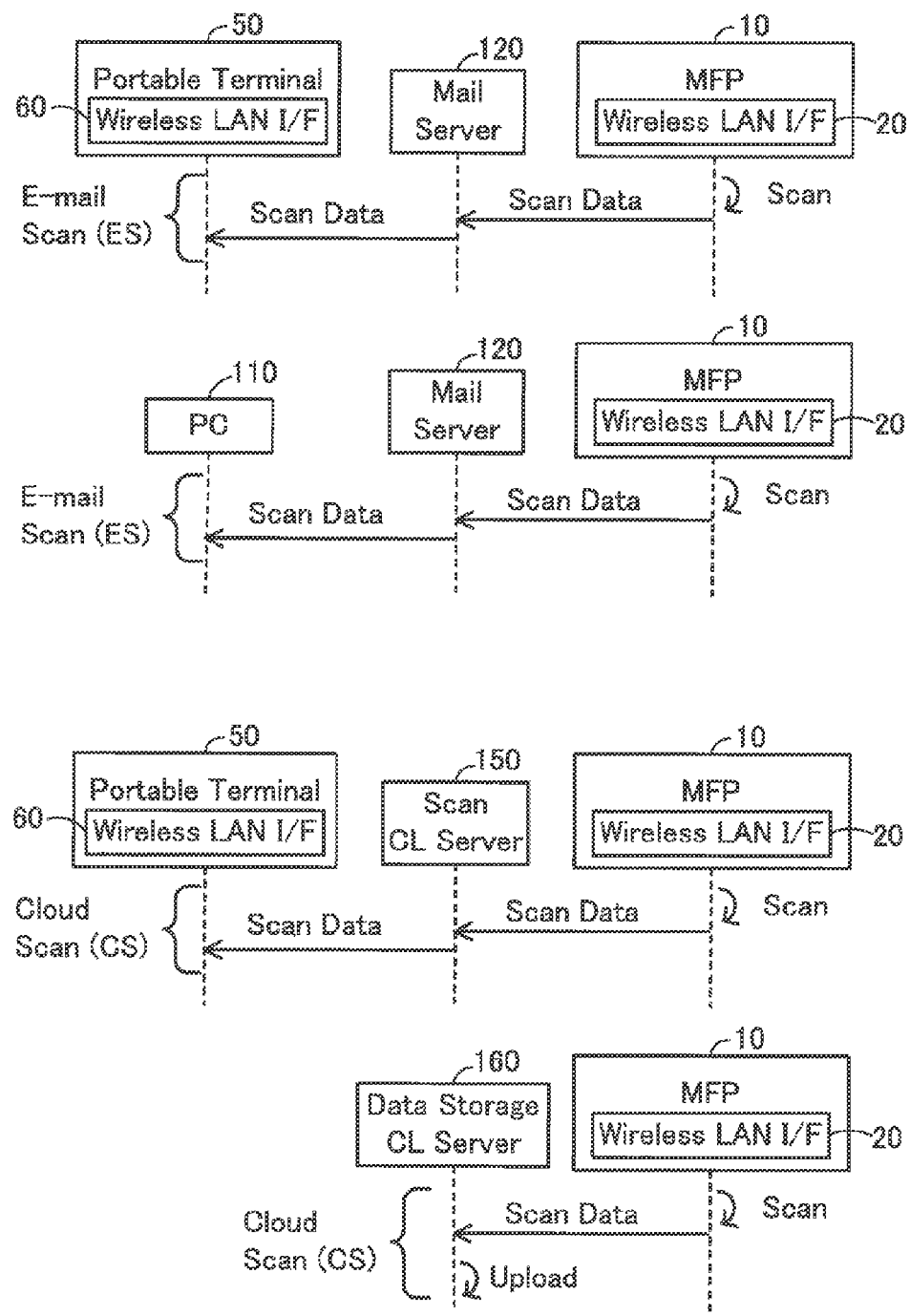
FIG. 3 shows a view for describing a scan function which the MFP is capable of executing.

(Scan Function which MFP 10 is Capable of Executing; FIGS. 2, 3)

Scan functions which the MFP 10 is capable of executing will be described with reference to FIG. 2 and FIG. 3. The scan functions are classified into direct scan (called "DS" below), E-mail scan (called "ES" below), and cloud scan (called "CS" below).

(DS)

In DS, the sending of scan data from the MFP 10 to the portable terminal 50 can be executed not via the Internet. DS is classified into normal Wi-Fi scan, WFD scan, and BT scan.

(Normal Wi-Fi Scan)

In normal Wi-Fi scan, the communication of scan data is executed by using a normal Wi-Fi NW formed in accordance with a normal Wi-Fi scheme. The normal Wi-Fi scheme is a wireless communication scheme defined by Wi-Fi Alliance, and is a wireless communication scheme for executing a wireless communication via the AP 100.

FIG. 2 shows a normal Wi-Fi NW that includes the MFP 10, the portable terminal 50, and the AP 100. In a state where this type of normal Wi-Fi NW has been formed, the wireless LAN I/F 20 of the MFP 10 can send scan data to the wireless LAN I/F 60 of the portable terminal 50, via the AP 100, by using the normal Wi-Fi NW.

The MFP 10 and the portable terminal 50 each store WSI for belonging to the normal Wi-Fi NW (i.e., WSI for executing a normal Wi-Fi communication (called "normal Wi-Fi WSI" below)). The normal Wi-Fi WSI includes an SSID, BSSID, authentication scheme, encryption scheme, password, etc. The SSID is identification information for identifying the normal Wi-Fi NW, and is generated by the AP 100. The BSSID is identification information for identifying the AP 100 (i.e., a MAC address of the AP 100). The normal Wi-Fi WSI of the MFP 10 further includes an IP address of the MFP 10, and the normal Wi-Fi WSI of the portable terminal 50 further includes an IP address of the portable terminal 50. Moreover, in normal Wi-Fi scan, the MFP 10 and wireless LAN I/F 60 of the portable terminal 50 execute the communication of scan data by using, e.g., a communication protocol such as FTP (abbreviation of File Transfer Protocol).

(WFD Scan)

In WFD scan, the communication of scan data is executed by using a WFD NW formed in accordance with a WFD scheme. The WFD scheme is a wireless communication scheme described in the standard document "Wi-Fi Peer-to-Peer (P2P) Technical Specification Version 1.1", created by Wi-Fi Alliance.

Below, an apparatus capable of executing an operation in accordance with the WFD scheme, such as the MFP 10, the portable terminal 50, etc. is called a "WFD-compatible device". In the WFD standard document, three states are defined as the states of the WFD-compatible device: Group Owner state (called "G/O state" below), client state (called "CL state" below), and device state. The WFD-compatible device is capable of selectively operating in one state among the three states.

When a pair of WFD-compatible devices that are in the device state are to newly form a wireless network, the pair of WFD-compatible devices usually execute a wireless communication called G/O negotiation. In the G/O negotiation, it is determined that one of the pair of WFD-compatible devices will assume the G/O state (i.e., become a G/O device), and that the other of the pair of WFD-compatible devices will assume the CL state (i.e., become a CL device). Then the pair of WFD-compatible devices establishes a connection and forms the wireless network.

Below, a wireless network formed in accordance with a procedure (e.g., G/O negotiation) of the WFD scheme is called a "WFD NW". At a stage where the WFD NW has been newly formed by means of G/O negotiation, only one G/O device and one CL device belong to the WFD NW. However, the G/O device can establish a connection with another device, and cause the other device to newly participate in the WFD NW as a CL device. In this case, a state is formed in which two or more CL devices belong to the WFD NW. That is, one G/O device and one or more CL devices can be present in the WFD NW. The G/O device manages the one or more CL devices. Specifically, the G/O device registers the MAC address of each of the one or more CL devices in a management list in the memory of the G/O device. The G/O device is capable of executing, not via another device, a wireless communication of target data with the CL device registered in the management list. Further, the G/O device is capable of relaying a wireless communication of target data (e.g., print data, scan data, etc.) between the plurality of CL devices. In other words, the pair of CL devices are capable of executing a wireless communication of the target data via the G/O device.

FIG. 2 shows an example of the WFD NW in which the PC 110 is a G/O device, and the portable terminal 50 and the MFP 10 are CL devices. In a state where this type of WFD NW has been formed, the wireless LAN I/F 20 of the MFP 10, which is a CL device, can use the WFD NW to send scan data via the PC 110, which is a G/O device, to the wireless LAN I/F 60 of the portable terminal 50, which is a CL device.

FIG. 2 further shows an example of a WFD NW in which the MFP 10 is a G/O device and the portable terminal 50 is a CL device. In a state where this type of WFD NW has been formed, the wireless LAN I/F 20 of the MFP 10, which is a G/O device, can use the WFD NW to send scan data not via another device to the wireless LAN I/F 60 of the portable terminal 50, which is a CL device.

The MFP 10 and the portable terminal 50 each store WSI for belonging to the WFD NW (i.e., WSI for executing WFD communication (called "WFD WSI" below)). The WFD WSI includes an SSID, BSSID, authentication scheme, encryption scheme, password, etc. The SSID is identification information for identifying the WFD NW, and is generated by the G/O device. The BSSID is identification information for identifying the G/O device (i.e., a MAC address of the G/O device). The WFD WSI of the MFP 10 further includes the IP address of the MFP 10, and the WFD WSI of the portable terminal 50 further includes the IP address of the portable terminal 50. Moreover, in WFD scan, the MFP 10 and the portable terminal 50 execute the communication of scan data by using a communication protocol such as FTP.

(BT scan)

In BT scan, the communication of scan data is executed by using a BT NW formed in accordance with the BT scheme. FIG. 2 shows a BT NW that includes the MFP 10 and the portable terminal 50. In a state where this type of the BT NW has been formed, the BT I/F 24 of the MFP 10 can use the BT NW to send scan data to the BT I/F 64 of the portable terminal 50, not via another device.

The MFP 10 and the portable terminal 50 each store WSI for belonging to the BT NW (i.e., WSI for executing BT communication (called "BT WSI" below)). The BT WSI includes a PIN code (i.e., a pairing code). Moreover, in the BT scan, the MFP 10 and the portable terminal 50 execute a communication of scan data, by using a communication protocol such as, e.g., BPP (abbreviation of Basic Printing Profile), BIP (abbreviation of Basic Imaging Profile), OPP (abbreviation of Object Push Profile), etc.

(ES)

In ES, the sending of scan data (i.e., an E-mail communication) from the MFP 10 to another device (e.g., the portable terminal 50, the PC 110) is executed via the internet. As shown in FIG. 3, the wireless LAN I/F 20 of the MFP 10 can send scan data to the wireless LAN I/F 60 of the portable terminal 50 via the mail server 120. In order to execute this type of ES, the MFP 10 stores at least the sending ESI for sending E-mail (i.e., SMTP setting information) in the memory 74. Further, the portable terminal 50 stores at least receiving ESI for receiving E-mail (i.e., POP setting information) in the memory 34. Further, as shown in FIG. 3, the wireless LAN I/F 20 of the MFP 10 can also send scan data to the PC 110 via the mail server 120.

The SMTP setting information includes a URL (abbreviation of Uniform Resource Locator) of an SMTP server, user name, password, etc. The POP setting information includes a URL of a POP server, user name, password, etc. In the present embodiment, the SMTP server and the POP server are shown as the one mail server 120 but, in a variant, may be configured separately. In ES, the MFP 10 and the portable terminal 50 execute communication of scan data by using the SMTP and POP communication protocols.

(CS)

In CS, the sending of scan data (i.e., cloud communication) from the MFP 10 to the portable terminal 50 is executed via the Internet. As shown in FIG. 3, the wireless LAN I/F 20 of the MFP 10 can send scan data to the wireless LAN I/F 60 of the portable terminal 50 via the scan CL server 150. In order to execute this type of cloud communication, the MFP 10 and the portable terminal 50 each store scanning CSI for communicating with the scan CL server 150. The scanning CSI includes a URL of the scan CL server 150, account information, authentication information (e.g., an access token), etc.

As shown in FIG. 3, the MFP 10 can further send scan data to the data storage CL server 160. According to this, the MFP 10 can upload the scan data to the data storage CL server 160. In order to execute this type of cloud communication, the MFP 10 stores the scanning CSI for communicating with the data storage CL server 160. The scanning CSI includes a URL of the data storage CL server 160, account information, authentication information, etc. in CS, the MFP 10 and the portable terminal 50 execute the communication of scan data by using, e.g., an HTTP (abbreviation of Hyper Text Transfer Protocol) communication protocol.

Above DS, ES, CS are each scan functions which the MFP 10 is capable of executing but, in other words, mean communication schemes for the MFP 10 to send scan data. That is, DS means a communication scheme which is a direct scheme (i.e., the normal Wi-Fi scheme, the WFD scheme, and the BT scheme). ES, CS mean communication schemes which are an E-mail scheme and a cloud scheme, respectively. That is, the MFP 10 can send scan data by using any of three communication schemes, namely direct scheme, E-mail scheme, and cloud scheme.

Figure 4:
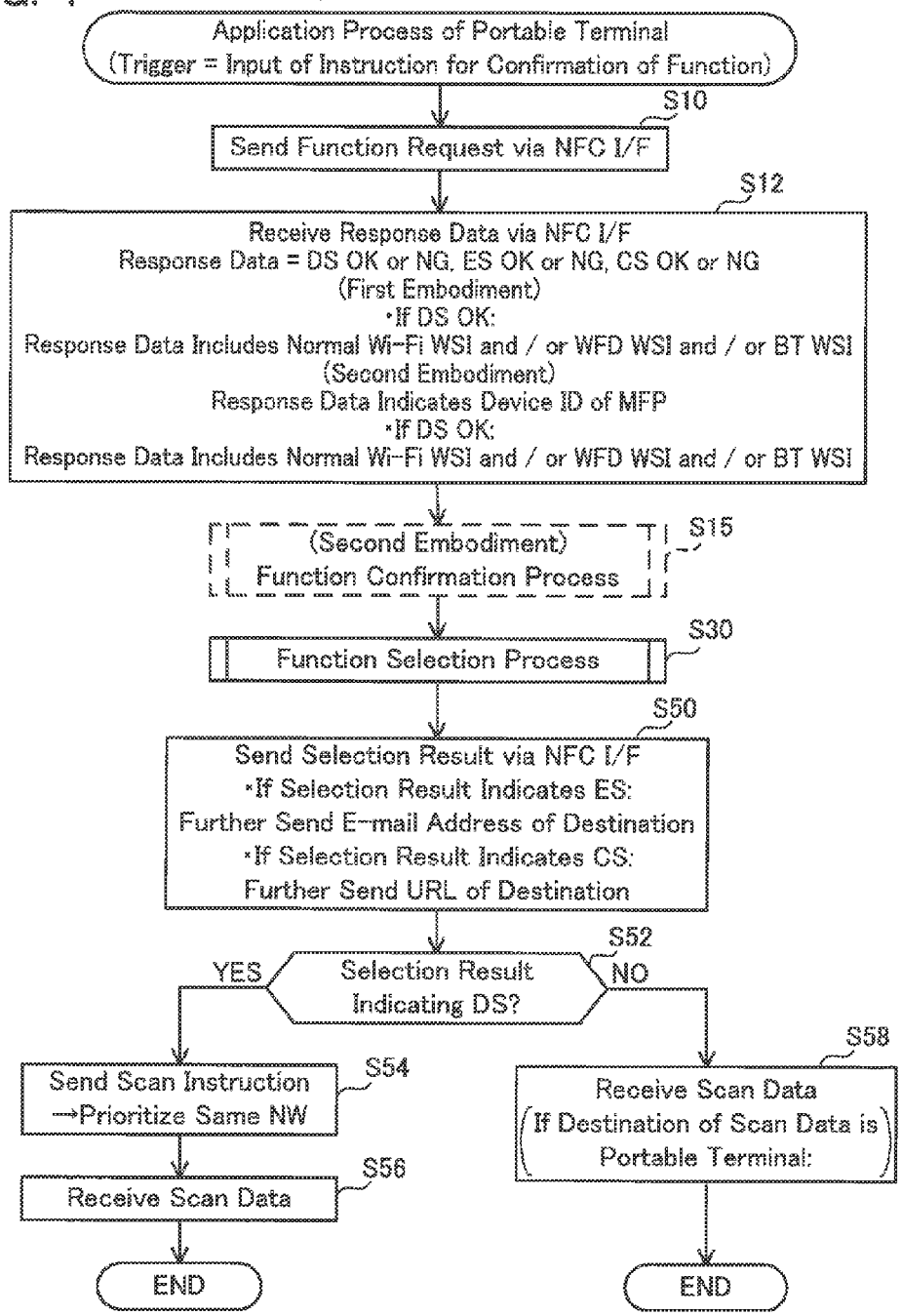
FIG. 4 shows a flowchart of an application process of a portable terminal of a first embodiment.

(Application Process of Portable Terminal 50; FIG. 4)

Next, the contents of a process realized by the MFP application installed on the portable terminal 50 will be described with reference to FIG. 4. In case of wanting to cause the MFP 10 to execute sending of scan data, the user of the portable terminal 50 operates the operating key 52, activating the MFP application. Next, in order to establish an NFC connection between the MFP 10 and the portable terminal 50, the user brings the portable terminal 50 closer to the MFP 10.

When the distance between the portable terminal 50 and the MFP 10 becomes less than a distance (e.g., 10 cm) across which NFC communication can be executed, an NFC connection is established between the MFP 10 and the portable terminal 50. In this case, in S10, the CPU 72 sends a function request to the MFP 10 via the NFC I/F 62 by using the above NFC connection. The function request is a request to cause response data (to be described) to be sent to the MFP 10 (see S100, S102 of FIG. 8).

In S12, the CPU 72 receives the response data from the MFP 10 via the NFC I/F 62 by using the above NFC connection. In a case where the MFP 10 is capable of executing DS, the response data includes information indicating DS OK, and in a case where the MFP is not capable of executing DS, the response data includes information indicating DS NG. In a case where the MFP 10 is capable of executing ES, the response data includes information indicating ES OK, and in a case where the MFP is not capable of executing ES, the response data includes information indicating ES NG. In a case where the MFP 10 is capable of executing CS, the response data includes information indicating CS OK and in a case where the MFP is not capable of executing CS, the response data includes information indicating CS NG.

In the case of including the information indicating DS OK, the response data further includes network information corresponding to DS. Specifically, in a case where the MFP 10 belongs to a normal Wi-Fi NW, the network information corresponding to DS includes, within the normal Wi-Fi WSI of the MFP 10, a set of IDs (i.e., a set of normal Wi-Fi SSID and normal Wi-Fi BSSID), and normal Wi-Fi IP address of the FP 10. Moreover, in this case, the network information corresponding to DS does not include a password within the normal Wi-Fi WSI of the MFP 10. This is because a security policy has been adopted in the present embodiment whereby, in the normal Wi-Fi NW, the AP 100 is authorized to cause another device to participate in the normal Wi-Fi NW, but a device (e.g., the MFP 10, the portable terminal 50) different from the AP 100 is not authorized to cause another device to participate in the normal Wi-Fi NW. However, in a variant, the network information corresponding to DS may include a password.

Further, in a case where the MFP 10 belongs to the WFD NW, the network information corresponding to DS includes, within the WFD WSI of the MFP 10, a set of IDs (i.e., a set of WFD SSID and WFD BSSID), and WFD IP address of the MFP 10. Moreover, in a case where the MFP 10 is in the G/O state, the network information corresponding to DS further includes a password within the WFD WSI of the MFP 10. However, in a case where the MFP 10 is in the CL state, the network information corresponding to DS does not include the password within the WFD WSI of the MFP 10. This is because a security policy has been adopted in the present embodiment whereby, in the WFD NW, the G/O device is authorized to cause another device to participate in the WFD NW, but a CL device is not authorized to cause another device to participate in the WFD NW. However, in a variant, in the case where the MFP 10 is in the CL state, the network information corresponding to DS may include the password.

Further, in a case where the MFP 10 belongs to a BT NW, the network information corresponding to DS includes the BT WSI.

In S30, the CPU 72 executes a function selection process. As will be described in detail later, in the function selection process (FIG. 5 to FIG. 7), the CPU 72 selects one communication scheme from among the one or more communication schemes (DS, ES, CS) which the MFP 10 is capable of executing.

Next, in S50, the CPU 72 sends the selection result (i.e., DS, ES, or CS) of the function selection process of S30 to the MFP 10 via the NFC I/F 62 by using the NFC connection. In a case where the selection result is ES, the CPU 72 further sends an E-mail address of the scan data destination to the MFP 10. The E-mail address is an address designated in advance by the user of the portable terminal 50, and may be, e.g., an E-mail address of the portable terminal 50, or an E-mail address of a device (e.g., the PC 110) different from the portable terminal 50. In a case where the selection result is CS, the CPU 72 further includes a URL of the scan data destination. The URL is a URL designated in advance by the user of the portable terminal 50, and may be, e.g., a URL of the scan CL server 150, or a URL of the data storage CL server 160.

Upon the selection result being sent to the MFP 10 in S50, the MFP 10 sends scan data in accordance with a communication scheme (i.e., DS, ES, or CS) corresponding to the selection result (to be described, see S112). According to this, as will be described, the portable terminal 50 can receive the scan data from the MFP 10 (S56, S58).

Thus, in the present embodiment, the CPU 72 executes sending of the function request (S10), receiving of the response data DS OK, etc. (S12), and sending of the selection result (S50). That is, the CPU 72 executes these communications in one session of a NFC connection. Upon ending S52, the NFC connection is disconnected.

In S52, the CPU 72 determines whether the selection result indicates DS. In a case where the selection result indicates DS, the CPU 72 determines YES in S52, and proceeds to 554. On the other hand, in a case where the selection result indicates ES or CS, the CPU 72 determines NO in S52, and proceeds to S58.

In S54, the CPU 72 first determines whether the MFP 10 and the portable terminal 50 are belonging to the same NW. For example, in a case where a set of normal Wi-Fi SSID and normal Wi-Fi BSSID included in the response data of the MFP 10 and a set of normal Wi-Fi SSID and normal Wi-Fi BSSID of the portable terminal 50 within the memory 74 are identical, the CPU 72 determines that the MFP 10 and the portable terminal 50 are belonging to the same normal Wi-Fi NW. Further, e.g., in a case where a set of WFD SSID and WFD BSSID of the MFP 10 included in the response data and a set of WFD SSID and WFD BSSID of the portable terminal 50 within the memory 74 are identical, the CPU 72 determines that the MFP 10 and the portable terminal 50 are belonging to the same WFD NW. Further, e.g., in a case where a PIN code included in the BT WSI of the MFP 10 included in the response data and a PIN code included in the BT WSI of the portable terminal 50 within the memory 74 are identical, the CPU 72 determines that the MFP 10 and the portable terminal 50 are belonging to the same BT NW.

Moreover, in the present embodiment, the CPU 72 determines whether the MFP 10 and the portable terminal 50 are belonging to the same NW (the normal Wi-Fi NW or the WFD NW) by determining whether the sets of SSID and BSSID are identical. However, in a variant, the CPU 72 may determine whether the MFP 10 and the portable terminal 50 are belonging to the same NW by determining only whether the SSIDs are identical, or by determining only whether the BSSIDs are identical.

In a case where the CPU 72 determines that the MFP 10 and the portable terminal 50 are belonging to the same NW, the CPU 72 sends a scan instruction to the MFP 10 by using the same NW. For example, in a case where the same NW is a normal Wi-Fi NW, the CPU 72 sends a scan instruction via the wireless LAN I/F 60, with the normal Wi-Fi IP address of the MFP 10 included in the response data as the destination. According to this, the MFP 10 receives the scan instruction from the portable terminal 50 via the AP 100. The scan instruction includes the IP address of the portable terminal 50 used in the normal Wi-Fi NW. Consequently, the MFP 10 can send scan data to the portable terminal 50 via the AP 100 by sending scan data with the IP address as the destination (see normal Wi-Fi scan of FIG. 2).

Further, e.g., in a case where the aforementioned same NW is a WFD NW, the CPU 72 sends a scan instruction via the wireless LAN I/F 60, with the WFD IP address of the MFP 10 included in the network information as the destination.

According to this, the MFP 10 receives the scan instruction from the portable terminal 50 via the PC 110, which is a G/O device, or not via another device. The scan instruction includes the IP address of the portable terminal 50 used in the WFD NW. Consequently, the MFP 10 can send scan data to the portable terminal 50 via the PC 110, which is a G/O device, or not via another device, by sending scan data with the IP address as the destination (see WFD scan of FIG. 2).

Further, e.g., in a case where the aforementioned same NW is a BT NW, the CPU 72 sends a scan instruction via the BT I/F 64 by using the PIN code included in the BT WSI of the MFP 10 (i.e., the BT WSI of the portable terminal 50). According to this, the MFP 10 receives the scan instruction from the portable terminal 50 not via another device. Consequently, the MFP 10 can send scan data to the portable terminal 50 not via another device (see BT scan of FIG. 2).

As described above, in S54, in a case where the MFP 10 and the portable terminal 50 are belonging to the same NW, the portable terminal 50 sends the scan instruction to the MFP 10 by prioritizing the same NW. According to this, the portable terminal 50 can quickly receive the scan data from the MFP 10 without needing to establish a wireless connection with the MFP 10.

Moreover, in a case where the MFP 10 and the portable terminal 50 are belonging to two or more same NWs, the CPU 72 prioritizes the NW having a faster communication speed. For example, in a case where the MFP 10 and the portable terminal 50 are belonging to the same WFD NW and to the same BT NW, the CPU 72 sends the scan instruction to the MFP 10 by using the WFD NW.

Further, in a case where it is determined that the MFP 10 and the portable terminal 50 are not belonging to the same NW, the CPU 72 executes the following process. As described above, the response data does not include the password used in the normal Wi-Fi NW to which the MFP 10 is belonging. Consequently, the CPU 72 cannot cause the portable terminal 50 to participate in the normal Wi-Fi NW.

The response data can include the information (WFD SSID, WFD BSSID, password, and WFD IP address of the MFP 10) used in the WFD NW in which the MFP 10 is the G/O device. In this case, the CPU 72, establishes a wireless connection with the MFP 10, which is a G/O device, by using this information. According to this, the CPU 72 can cause the portable terminal 50 to participate, as a CL device, in the WFD NW in which the MFP 10 is the G/O device. Then, the CPU 72 sends the scan instruction via the wireless LAN I/F 60 with, as the destination, the WFD IP address of the MFP 10 included in the destination information.

Further, the response data can include the BT WSI (i.e., PIN code) of the MFP 10. In this case, the CPU 72 establishes a wireless connection with the MFP 10 by using the BT WSI. Then, the CPU 72 sends the scan instruction via the BT I/F 64 by using the PIN code.

Moreover, in a case where the response data includes both the information used in the WFD NW in which the MFP 10 is the G/O device, and the BT WSI of the MFP 10, the CPU 72 prioritizes use of the WFD NW, which has the higher communication speed, and causes the portable terminal 50 to participate as a CL device in the WFD NW in which the MFP 10 is the G/O device.

As described above, when the scan instruction is sent to the MFP 10 in S54, the MFP 10 sends the scan data to the portable terminal 50. In S56, the CPU 72 receives the scan data from the MFP 10. In a case where the normal Wi-Fi NW or WFD NW is used, the CPU 72 receives the scan data via the wireless LAN I/F 60. In a case where the BT NW is used, the CPU 72 receives the scan data via the BT I/F 64.

On the other hand, in a case where the selection result is ES (NO in S52), the selection result sent in S50 includes the E-mail address of the scan data destination. In a case where the E-mail address of the scan data destination is the E-mail address of the portable terminal 50 itself, in S58 the CPU 72 receives the scan data from the MFP 10 via the E-mail server 120 (see the upper figure of ES of FIG. 3).

Moreover, in a case where the portable terminal 50 belongs to a wireless LAN (i.e., a normal Wi-Fi NW or a WFD NW), the CPU 72 receives the E-mail via the wireless LAN I/F 60. According to this, the portable terminal 50 can receive the E-mail from the MFP 10 via the wireless LAN and the internet (i.e., the mail server 120). Further, in a case where the portable terminal 50 belongs to a cellular NW, the CPU 72 can receive the E-mail via the cellular NW I/F 66. According to this, the portable terminal 50 can receive the E-mail via the cellular NW and the internet (i.e., the mail server 120).

Further, in a case where the portable terminal 50 is belonging to both a wireless LAN and a cellular NW, the CPU 72 receives the E-mail via the wireless LAN I/F 60. That is, the CPU 72 prioritizes use of the wireless LAN to receive the E-mail. The reason is as follows. That is, cellular communication using a cellular NW may be subject to being charged for at a metered rate in accordance with the data size of communication data, whereas a normal Wi-Fi communication (or WFD communication) using a wireless LAN is normally not subject to being charged for at a metered rate. Consequently, the CPU 72 prioritizes use of the wireless LAN to receive the E-mail.

Moreover, in a case where the E-mail address of the scan data destination is the E-mail address of a device different from the portable terminal 50 (e.g., the E-mail address of the PC 110), in S58 the CPU 72 does not receive an E-mail, from the MFP 10, that includes the scan data (see the lower figure of ES of FIG. 3).

Further, in a case where the selection result is CS (NO in S52), the selection result sent in S50 includes the URL of the scan data destination. In a case where the URL of the scan data destination is the URL of the scan CL server 150, in S58 the CPU 72 receives the scan data from the MFP 10 via the scan CL server 150 (see the upper figure of CS of FIG. 3). Moreover, which I/F to use, of the wireless LAN I/F 60 and the cellular NW I/F 66, is the same as the case of ES. The portable terminal 50 can receive the scan data from the MFP 10 via the wireless LAN or cellular NW and via the internet (i.e., the scan CL server 150) (see the upper figure of CS of FIG. 3).

Moreover, in a case where the URL of the scan data destination is the URL of the data storage CL server 160, in S58 the CPU 72 does not receive the scan data from the MFP 10 (see the lower figure of CS of FIG. 3).

Figure 5:
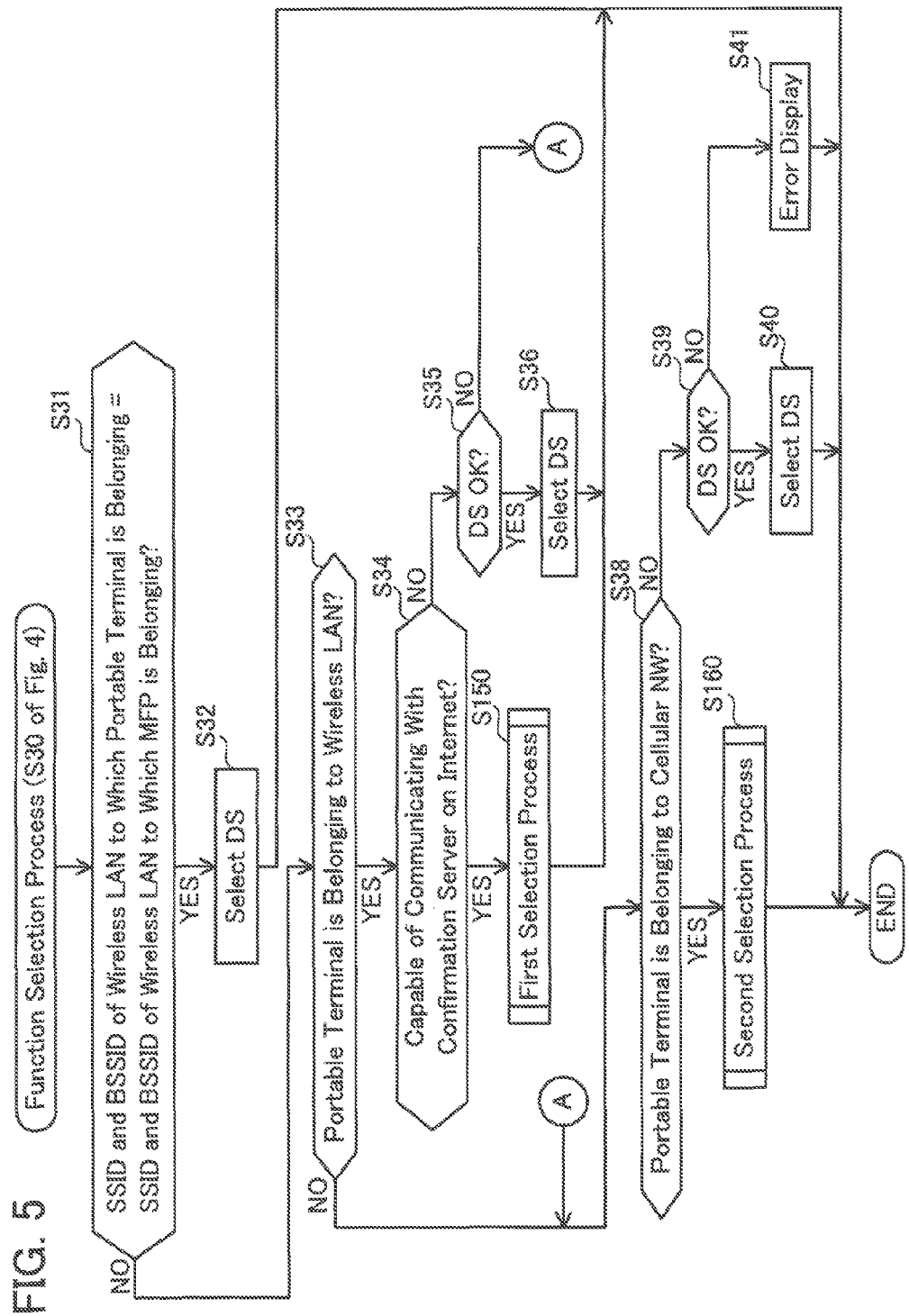
FIG. 5 shows a flowchart of a function selection process.

(Function Selection Process; FIG. 5)

Next, the function selection process of S30 of FIG. 4 will be described with reference to FIG. 5. In S31, the CPU 72 determines whether the MFP 10 and the portable terminal 50 are belonging to the same normal Wi-Fi NW or the same WFD NW. In a case where neither the normal Wi-Fi WSI nor the WFD WSI of the portable terminal 50 is being stored in the memory 74, the CPU 72 determines NO in 831, and proceeds to S33.

In a case where the normal Wi-Fi WSI of the portable terminal 50 is being stored in the memory 74, the CPU 72 determines whether a set of SSID and BSSID (called "first set" below) which is identical to the set of normal Wi-Fi SSID and normal Wi-Fi BSSID included in the normal Wi-Fi WSI, is included in the response data. In a case where the first set is included in the response data, the CPU 72 determines YES in S31, and proceeds to S32, and in a case where the first set is not included in the response data, the CPU 72 determines NO in S31, and proceeds to S33.

Further, in a case where the WFD WSI of the portable terminal 50 is being stored in the memory 74, the CPU 72 determines whether a set of SSID and BSSID (called "second set" below) which is identical to the set of WFD SSID and WFD BSSID of that WFD WSI, is included in the response data. In a case where the second set is included in the response data, the CPU 72 determines YES in S31, and proceeds to S32, and in a case where the second set is not included in the response data, the CPU 72 determines NO in S31, and proceeds to S33.

As described above, in the case of determining YES in S31, the response data includes at least one of the first set and the second set. In this type of situation, since the MFP 10 is capable of executing at least one from among normal Wi-Fi scan and WFD scan (see S72, S75 of FIG. 9, to be described), the MFP 10 sends response data which includes DS OK to the portable terminal 50. Moreover, in this case, the response data includes OK or NG for each of ES and CS. In S32, the CPU 72 selects DS from among the one or more communication schemes (at least DS) indicating OK included in the response data, and ends the function selection process. In this case, since the MFP 10 and the portable terminal 50 are belonging to the same normal Wi-Fi NW or the same WFD NW, in S56 of FIG. 4 the CPU 72 can receive the scan data from the MFP 10 by using that same NW (i.e., in accordance with DS).

In S33, the CPU 72 determines whether the portable terminal 50 is belonging to a wireless LAN (i.e., a normal Wi-Fi NW, a WFD NW). In a case where at least one of the normal Wi-Fi WSI and the WFD WSI is being stored in the memory 74, the CPU 72 determines YES in S33, and proceeds to S34, and in a case where neither of the normal Wi-Fi WSI and the WFD WSI is being stored in the memory 74, the CPU 72 determines NO in S33, and proceeds to S38.

In S34, the CPU 72 determines whether the portable terminal 50 is capable of executing an internet communication via the wireless LAN. Specifically, the CPU 72 determines whether the portable terminal 50 is capable of communicating with the confirmation server 130 on the internet. That is, the CPU 72 sends a signal via the wireless LAN I/F 60, with the URL of the confirmation server 130 stored in advance in the memory 34 as the destination, and monitors whether a response signal is received from the confirmation server 130. In a case where a response signal from the confirmation server 130 is received, the CPU 72 determines YES in S34, and proceeds to S150. In this case, the portable terminal 50 is capable of executing internet communication via the wireless LAN. On the other hand, in a case where a response signal from the confirmation server 130 is not received, the CPU 72 determines NO in S34, and proceeds to S35.

Figure 6:
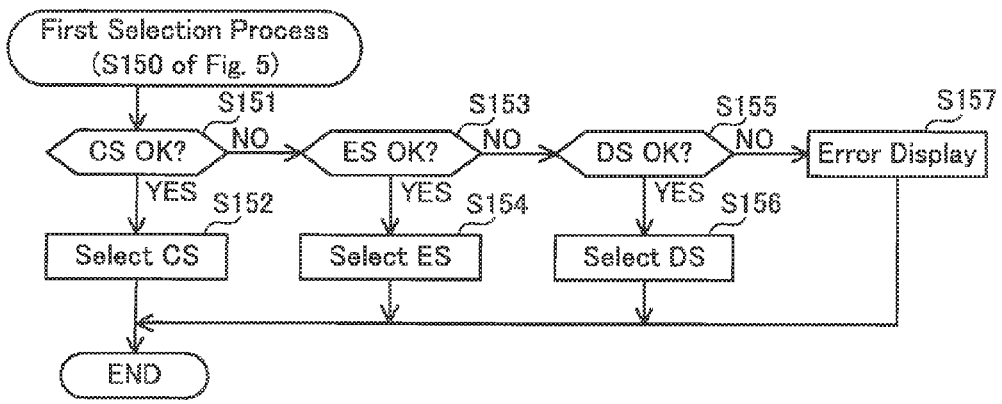
FIG. 6 shows a flowchart of a first selection process.

(First Selection Process; FIG. 6)

In S150, a first selection process (see FIG. 6) is executed by the CPU 72. In S151, the CPU 72 determines whether information indicating CS OK is included in the response data. In a case where information indicating CS OK is included in the response data, the CPU 72 determines YES in S151, selects CS in S152, and ends the first selection process.

In a case where information indicating CS NG is included in the response data, the CPU 72 determines NO in S151 and, in S153, determines whether information indicating ES OK is included in the response data. In a case where information indicating ES OK is included in the response data, the CPU 72 determines YES in S153, selects ES in S154, and ends the first selection process.

In a case where information indicating ES NG is included in the response data, the CPU 72 determines NO in S153 and, in S155, determines whether information indicating DS OK is included in the response data. In a case where information indicating DS OK is included in the response data, the CPU 72 determines YES in S155, selects DS in S156, and ends the first selection process.

On the other hand, in a case where information indicating DS NG is included in the response data, the CPU 72 determines NO in S155, in S157 causes the display mechanism 54 to display an error screen indicating that the MFP 10 cannot be caused to execute sending of the scan data, and ends the first selection process. Moreover, in a case where S157 is executed, the processes from S50 of FIG. 4 onwards are not executed.

The first selection process is executed in the situation where the portable terminal 50 is belonging to a wireless LAN (i.e., a normal Wi-Fi NW, a WFD NW) (YES in S33 of FIG. 5). Then, priority in selecting the communication scheme is in the order CS, ES, DS (see FIG. 6). The reason for prioritizing CS and ES, in which the internet is used, over DS, which does not use the internet, is as follows.

Since the portable terminal 50 and the MFP 10 are not belonging to the same NW (NO in S31), the portable terminal 50 must execute a process to establish a wireless connection between the portable terminal 50 and the MFP 10 in order to use direct communication. By contrast, the portable terminal 50 does not need to establish the aforementioned wireless connection in order to use cloud communication or E-mail communication. Thus, from the viewpoint of reducing processing load, CS and ES are prioritized. Moreover, since the portable terminal 50 is belonging to the wireless LAN, in a case where CS or ES is selected, in S54 of FIG. 3 the portable terminal 50 receives the scan data from the MFP 10 by using the wireless LAN which is not a cellular NW. Consequently, even if CS or ES is selected, the communication of scan data is not subject to being charged for at a metered rate. Thus, from a cost viewpoint, prioritizing CS and ES is not a problem.

Moreover, prioritizing CS over ES is because, e.g., cloud communication may normally be better than E-mail communication in terms of security. Upon ending the first selection process, the CPU 72 ends the function selection process.

In S35 of FIG. 5, the CPU 72 determines whether information indicating DS OK is included in the response data. In a case where information indicating DS OK is included in the response data, the CPU 72 determines YES in S35, selects DS in S36, and ends the function selection process. In a case where the portable terminal 50 is belonging to a wireless LAN but is not capable of executing an internet communication via this wireless LAN (NO in S34), the portable terminal 50 is not capable of executing cloud communication and E-mail communication via this wireless LAN. Consequently, in S35 and S36, in a case where information indicating DS OK is included in the response data, the CPU 72 selects DS without selecting CS and ES. On the other hand, in a case where information indicating DS NG is included in the response data, the CPU 72 determines NO in S35, and proceeds to S38. However, in a variant, in a case where NO is determined in S34, S35 and S36 may be skipped, and processing may proceed to S38.

In S38, the CPU 72 determines whether the portable terminal 50 is belonging to a cellular NW. In a case where the portable terminal 50 is belonging to a cellular NW, the CPU 72 determines YES in S38, and proceeds to S160. On the other hand, in a case where the portable terminal 50 is not belonging to a cellular NW, the CPU 72 determines NO in S38, and proceeds to S39.

Figure 7:
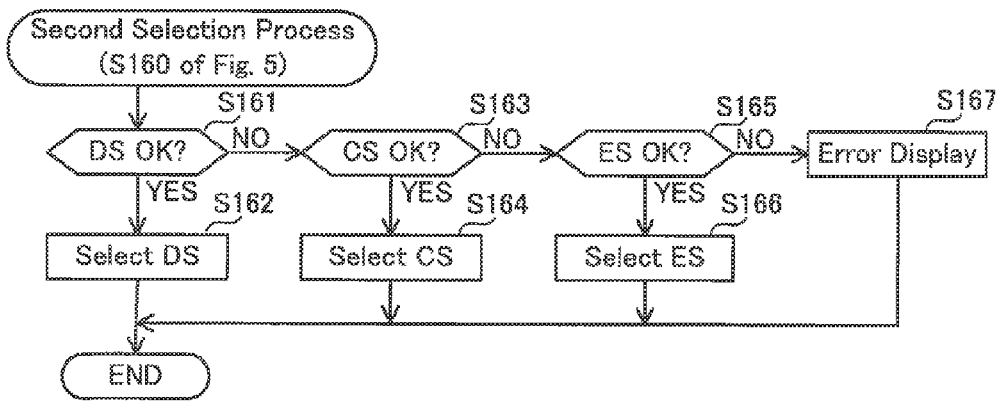
FIG. 7 shows a flowchart of a second selection process.

(Second Selection Process; FIG. 7)

In S160, the CPU 72 executes a second selection process (see FIG. 7). In the second selection process, the order of processes is different from the first selection process (FIG. 6). That is, in the first selection process, priority is in the order CS, ES, DS whereas, in the second selection process, priority is in the order DS, CS, ES. S161, 162 are the same as S155, 156 of FIG. 6. S163, 164 are the same as S151, 152 of FIG. 6, and S165, 166 are the same as S153, 154 of FIG. 6. S167 is the same as S157 of FIG. 6.

The second selection process is executed in the situation where the portable terminal 50 is belonging to a cellular NW (YES in S38 of FIG. 5) while in a state of the portable terminal 50 either not belonging to a wireless LAN (i.e., the normal Wi-Fi NW, the WFD NW) (NO in S33 of FIG. 5), or not being capable of executing an internet communication via a wireless LAN (NO in S34 of FIG. 5). That is, the second selection process is executed in the situation where the portable terminal 50 is not capable of executing an internet communication via a wireless LAN, and is belonging to the cellular NW. Then, priority in selecting the communication scheme is in the order DS, CS, ES (see FIG. 7). DS, in which the internet is not used, is prioritized over CS and ES, in which the internet is used, for the following reason.

Since the portable terminal 50 is not capable of executing an internet communication via a wireless LAN, and is belonging to a cellular NW, in a case where CS or ES is selected, the portable terminal 50 receives scan data from the MFP 10 in S58 of FIG. 4 by using the cellular NW. Consequently, in a case where CS or ES is selected, the communication of scan data may be subject to being charged for at a metered rate. By contrast, in a case where DS is selected, in S54 of FIG. 4 the portable terminal 50 newly establishes a wireless connection with the MFP 10, and receives scan data from the MFP 10 by using the wireless LAN. In this case, since the cellular NW is not used, the communication of scan data is not subject to being charged for at a metered rate. Thus, from the viewpoint of cost, DS is prioritized.

S39, S40 are the same as S35, 36 respectively. That is, since the portable terminal 50 is not capable of executing an internet communication via a wireless LAN or a cellular NW, in a case where information indicating DS OK is included in the response data, the CPU 72 selects DS without selecting CS and ES. However, in a case where information indicating DS NG is included in the response data, the CPU 72 determines NO in S39 and, in S41, causes the display mechanism 54 to display an error screen indicating that the MFP 10 cannot be caused to execute sending of scan data. Moreover, in a case where S41 is executed, the processes from S50 of FIG. 4 onwards are not executed.

Figure 8:
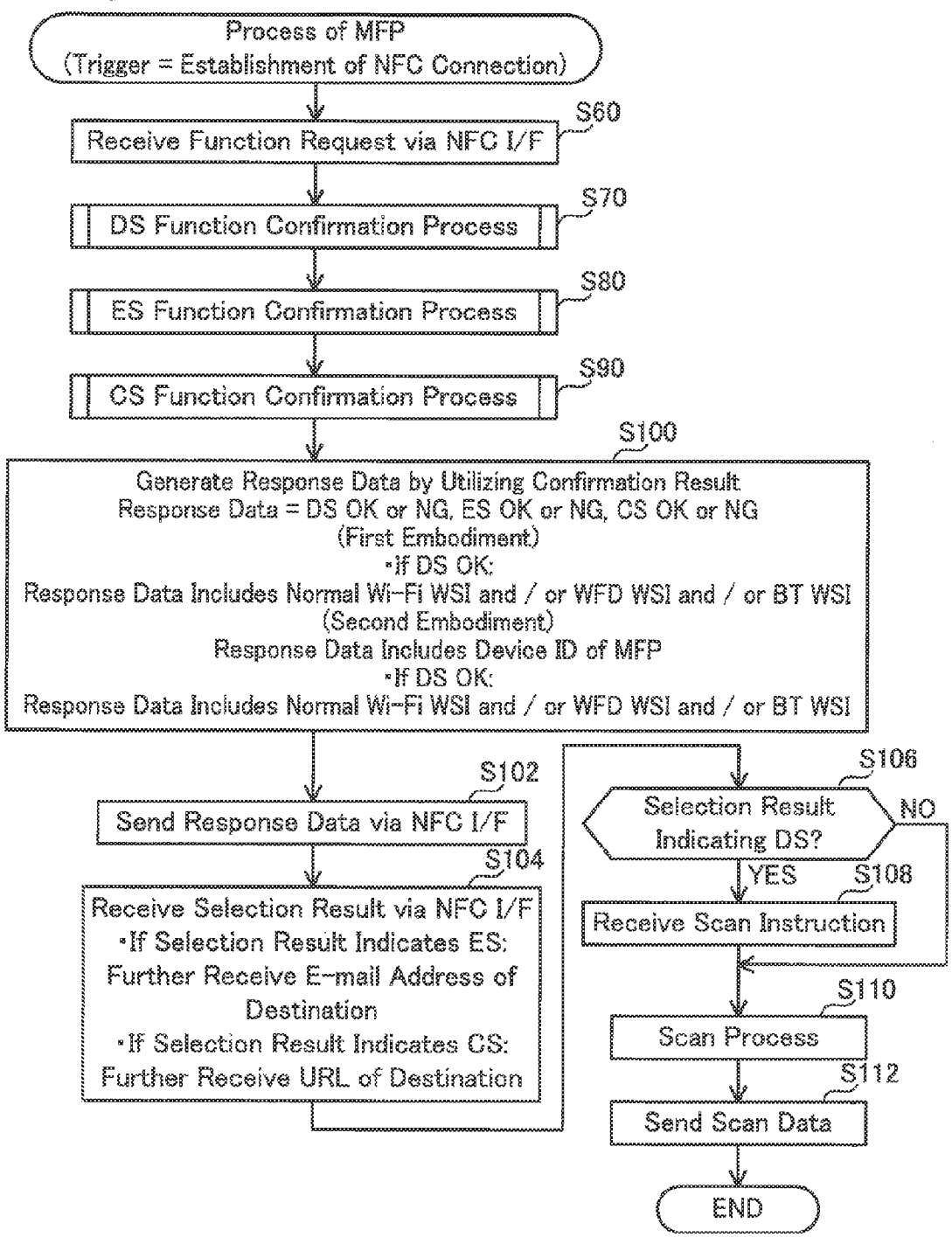
FIG. 8 shows a flowchart of a process of the MFP of first and second embodiments.

(Process of MFP 10; FIG. 8)

Next, contents of a process executed by the MFP 10 will be described with reference to FIG. 8. A process of FIG. 8 is started with establishment of an NFC connection between the MFP 10 and the portable terminal 50 as a trigger.

In S60, the CPU 32 receives a function request from the portable terminal 50 via the NFC I/F 22 (see S10 of FIG. 4). Next, in S70, S80, S90, the CPU 32 executes a DS function confirmation process (see FIG. 9), an ES function confirmation process (see FIG. 10), and a CS function confirmation process (see FIG. 11). In these processes, the CPU 32 specifies the scan function, among DS, ES, and CS, which the MFP 10 is capable of executing. These processes will be described in detail later.

Next, in S100, the CPU 32 generates response data by using a confirmation result of S70 to S90. As will be described in detail later, in S70, information indicating OK or NG is stored in the memory 34 for each of normal Wi-Fi scan, WFD scan, and BT scan. In S100, in a case where information indicating OK is being stored in the memory 34 for at least one of normal Wi-Fi scan, WFD scan, and BT scan, the CPU 32 generates response data which includes information indicating DS OK. Further, in a case where information indicating NG for all of normal Wi-Fi scan, WFD scan, and BT scan is being stored in the memory 34, the CPU 32 generates response data which includes information indicating DS NG.

Further, as will be described in detail later, in S80, information indicating ES OK or ES NG is stored in the memory 34, and in S90, information indicating CS OK or CS NG is stored in the memory 34. In S100, in a case where information indicating ES OK (or CS OK) is being stored in the memory 34, the CPU 32 generates response data which includes information indicating ES OK (or CS OK) and, in a case where information indicating ES NG (or CS NG) is being stored in the memory 34, the CPU 32 generates response data which includes information indicating ES NG (or CS NG).

In S100, when the CPU 32 generate response data which includes information indicating DS OK, the CPU 32 further generates response data which includes the network information corresponding to DS. Specifically, in a case where the MFP 10 is belonging to a normal Wi-Fi NW, the CPU 32 generates response data which includes, within the normal Wi-Fi WSI of the MFP 10 within the memory 34, a set of IDs (i.e., a set of normal Wi-Fi SSID and normal Wi-Fi BSSID), and the normal Wi-Fi IP address of the MFP 10.

Further, in a case where the FP 10 is belonging to a WFD NW as a G/O device, the CPU 32 generates response data which includes, within the WFD WSI of the MFP 10 within the memory 34, a set of IDs (i.e., a set of WFD SSID and WFD BSSID), the password, and the WFD IP address of the MFP 10. Further, in a case where the MFP 10 is belonging to a WFD NW as a CL device, the CPU 32 generates response data which includes, within the WFD WSI of the MFP 10 within the memory 34, the set of IDs (i.e., a set of WFD SSID and WFD BSSID), and the WFD IP address of the MFP 10.

Further, in a case where the MFP 10 is in the device state, i.e., in a case where the MFP 10 is not belonging to a WFD NW, the CPU 32 spontaneously moves the state of the MFP 10 from the device state to the G/O state without executing G/O negotiation. The CPU 32 further generates WFD WSI, and stores the WFD WSI in the memory 34. According to this, the CPU 32 can newly form a WFD NW to which only the MFP 10, which is a G/O device, belongs. Thereupon, the CPU 32 generates response data which includes, within the WFD WSI of the MFP 10 within the memory 34, a set of IDs (i.e., a set of WFD SSID and WFD BSSID), password, and WFD IP address of the MFP 10.

Further, in a case where the MFP 10 is belonging to a BT NW, the CPU 32 generates response data which includes the BT WSI within the memory 34. Moreover, in a case where the MFP 10 is not belonging to a BT NW, the CPU 32 generates BT WSI, and stores the BT WSI in the memory 34. According to this, the CPU 32 can newly form a BT NW to which only the MFP 10 belongs. Thereupon, the CPU 32 generates response data which includes the BT WSI of the MFP 10 within the memory 34.

In S102, the CPU 32 sends the response data to the portable terminal 50 via the NFC I/F 22. Next, in S104, the CPU 32 receives a selection result from the portable terminal 50 via the NFC I/F 22. Next, in S106, the CPU 32 determines whether the selection result indicates DS. In a case where the selection result indicates DS, the CPU 32 determines YES in S106, and proceeds to S108, and in a case where the selection result indicates ES or CS, the CPU 32 determines NO in S106, skips S108, and proceeds to S110.

In S108, the CPU 32 receives the scan instruction from the portable terminal 50. As described above, the scan instruction is sent from the portable terminal 50 to the MFP 10 by using the normal Wi-Fi NW, the WFD NW, or the BT NW (554 of FIG. 4). Consequently, the CPU 32 receives the scan instruction via the wireless LAN I/F 20, or via the BT I/F 24. Upon receiving the scan instruction, the CPU 32 proceeds to S110.

In S110, the CPU 32 causes the scan mechanism 18 to execute a scan of a document. According to this, the scan mechanism 18 generates scan data.

In S112, the CPU 32 sends the scan data in accordance with the communication scheme indicated by the selection result. For example, in a case where the selection result is DS, in S108 the CPU 32 receives the scan instruction from the portable terminal 50. For example, in case of receiving the scan instruction from the portable terminal 50 by using the normal Wi-Fi NW or the WFD NW, the CPU 32 sends the scan data via the wireless LAN I/F 20 with, as the destination, the IP address of the portable terminal 50 included in the scan instruction. According to this, the MFP 10 can send the scan data to the portable terminal 50 by using the normal Wi-Fi NW or the WFD NW. Further, e.g., in case of receiving the scan instruction from the portable terminal 50 by using the BT NW, the CPU 32 sends the scan data via the BT I/F 24. According to this, the MFP 10 can send the scan data to the portable terminal 50 by using the BT NW.

Further, e.g., in a case where the selection result is ES, the CPU 32 sends E-mail which includes scan data, with the E-mail address included in the selection result as the destination. In this case, the CPU 32 may send the scan data via the wireless LAN I/F 20, or may send the scan data via another I/F (e.g., a wired LAN I/F). For example, in a case where the E-mail address included in the selection result is the E-mail address of the portable terminal 50, the MFP 10 can send the scan data to the portable terminal 50. Further, e.g., in a case where the E-mail address included in the selection result is the E-mail address of the PC 110, the MFP 10 can send the scan data to the PC 110.

Further, e.g., in a case where the selection result is CS, the CPU 32 sends scan data, with the URL included in the selection result as the destination. In this case, the CPU 32 may send the scan data via the wireless LAN I/F 20, or may send the scan data via another I/F (e.g., a wired LAN I/F). For example, in a case where the URL included in the selection result is the URL of the scan CL server 150, the MFP 10 can send the scan data to the portable terminal 50 via the scan CL server 150. Further, e.g., in a case where the URL included in the selection result is the URL of the data storage CL server 160, the MFP 10 can send the scan data to the data storage CL server 160, and upload the scan data to the data storage CL server 160.

Figure 9:
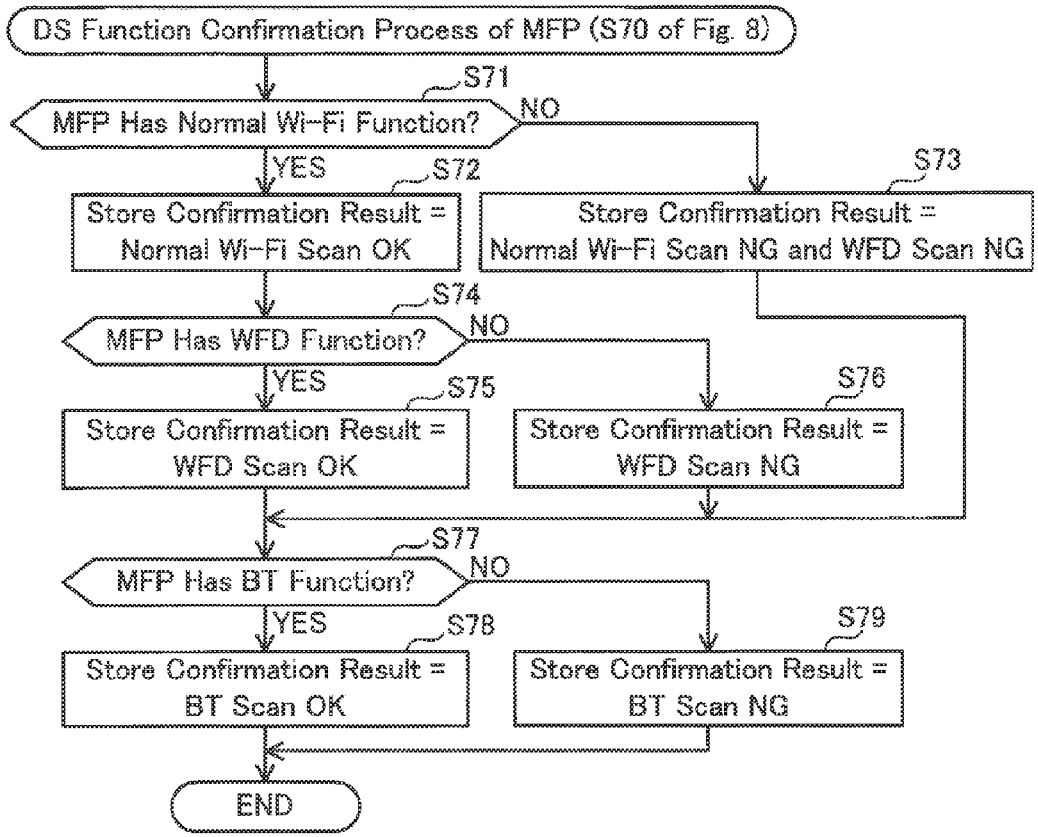
FIG. 9 shows a flowchart of a DS function confirmation process.

(DS Function Confirmation Process; FIG. 9)

The DS function confirmation process of S70 of FIG. 8 will be described with reference to FIG. 9. In S71, the CPU 32 determines whether the MFP 10 has the normal Wi-Fi function (i.e., whether the MFP 10 is comprising the wireless LAN I/F 20). In a case where the MFP 10 has the normal Wi-Fi function, the CPU 32 determines YES in S71 and, in 872, stores information indicating normal Wi-Fi scan OK in the memory 34. Upon ending 872, processing proceeds to 874.

On the other hand, in a case where the MFP 10 does not have the normal Wi-Fi function, the CPU 32 determines NO in S71 and, in S73, stores information indicating normal Wi-Fi scan NG, and information indicating WFD scan NG in the memory 34. Wireless communication of the WFD scheme is a wireless communication having wireless communication of the normal Wi-Fi scheme as a prerequisite. Consequently, in the case where the MFP 10 does not have the normal Wi-Fi function (the case of NO in 871), the MFP 10 does not have the WFD function either (i.e., a program for executing a WFD communication is not being stored in the memory 34). Consequently, in S73, not only information indicating normal Wi-Fi scan NG, but also information indicating WFD scan NG is stored in the memory 34. Upon ending S73, processing proceeds to S77.

In S74, the CPU 32 determines whether the MFP 10 has the WFD function (i.e., whether a program for executing WFD communication is being stored in the memory 34). In a case where the MFP 10 has the WFD function, the CPU 32 determines YES in S74 and, in 875, stores information indicating WFD scan OK in the memory 34. On the other hand, in a case where the MFP 10 does not have the WFD function, the CPU 32 determines NO in 874 and, in 876, stores information indicating WFD scan NG in the memory 34. Upon ending 875 or 876, processing proceeds to 877.

In S77, the CPU 32 determines whether the MFP 10 has the BT function (i.e., whether the MFP 10 is comprising the BT I/F 24). In a case where the MFP 10 has the BT function, the CPU 32 determines YES in S77 and, in 878, stores information indicating BT scan OK in the memory 34. On the other hand, in a case where the MFP 10 does not have the BT function, the CPU 32 determines NO in 877 and, in S79, stores information indicating BT scan NG in the memory 34.

Figure 10:
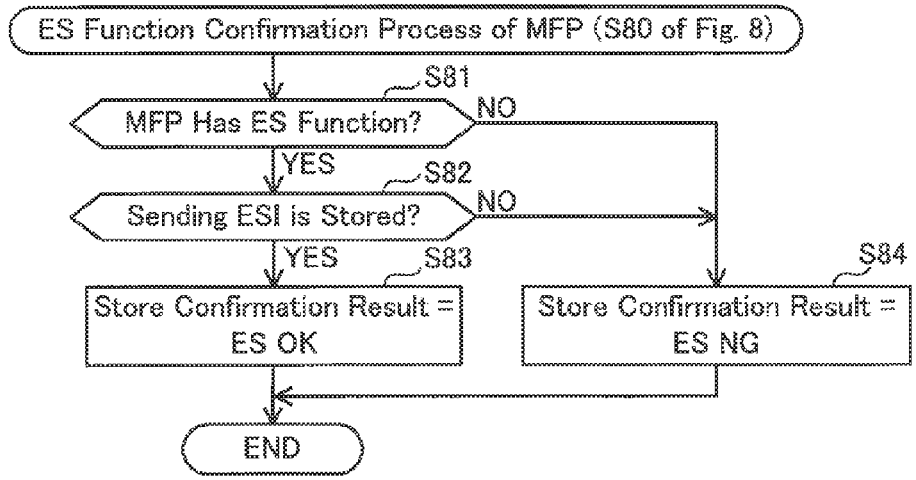
FIG. 10 shows a flowchart of an ES function confirmation process.

(ES Function Confirmation Process; FIG. 10)

The ES function confirmation process of S80 of FIG. 8 will be described with reference to FIG. 10. In S81, the CPU 32 determines whether the MFP 10 has the ES function (i.e., whether a program for sending an E-mail that includes scan data is being stored in the memory 34). In a case where the MFP 10 has the ES function, the CPU 32 determines YES in S81, and proceeds to S82. On the other hand, in a case where the MFP 10 does not have the ES function, the CPU 32 determines NO in S81 and, in S84, stores information indicating ES NG in the memory 34.

In S82, the CPU 32 determines whether the sending ESI (i.e., the SMTP setting information), which is the ESI for the MFP 10 to send E-mail, is being stored in the memory 34. In a case where the sending ESI is being stored in the memory 34, the CPU 32 determines YES in S82 and, in S83, stores information indicating ES OK in the memory 34. On the other hand, in a case where the sending ESI is not being stored in the memory 34, the CPU 32 determines NO in S82 and, in 884, stores information indicating ES NG in the memory 34.

Figure 11:
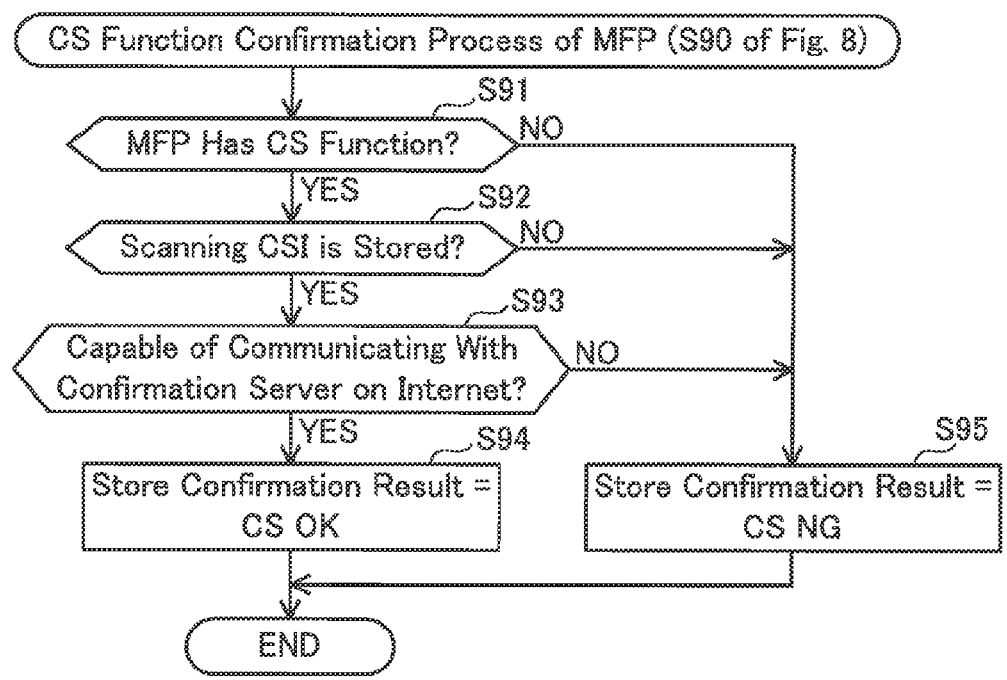
FIG. 11 shows a flowchart of a CS function confirmation process.

(CS Function Confirmation Process; FIG. 11)

The CS function confirmation process of S90 of FIG. 8 will be described with reference to FIG. 11. In S91, the CPU 32 determines whether the MFP 10 has the CS function (i.e., whether the scan CL server 150 and a program for executing cloud communication with data storage CL sever 160 are being stored in the memory 34). In a case where the MFP 10 has the CS function, the CPU 32 determines YES in S91, and proceeds to S92. On the other hand, in a case where the MFP 10 does not have the CS function, the CPU 32 determines NO in S91 and, in S95, stores information indicating CS NG in the memory 34.

In S92, the CPU 32 determines whether the scanning CSI (i.e., a URL of the server 150 or the server 160, account information, authentication information, etc.), which is the CSI for the MFP 10 to use the scan CL server 150 or data storage CL server 160, is being stored in the memory 34. In a case where the scanning CSI is being stored in the memory 34, the CPU 32 determines YES in S92, and proceeds to S93. On the other hand, in a case where the scanning CSI is not being stored in the memory 34, the CPU 32 determines NO in S92 and, in S95, stores information indicating CS NG in the memory 34.

In S93, the CPU 32 determines whether the MFP 10 is capable of communicating with the confirmation server 130 on the Internet. Specifically, the CPU 32 sends a signal with a URL of the confirmation server 130 stored in advance in the memory 34 as a destination, and monitors whether a response signal is received from the confirmation server 130. In a case where the response signal is received from the confirmation server 130, the CPU 32 determines YES in S93 and, in S94, stores information indicating CS OK in the memory 34. On the other hand, in a case where a response signal is not received from the confirmation server 130, the CPU 32 determines NO in S93 and, in S95, stores information indicating CS NG in the memory 34. Moreover, NO may be determined in S93, e.g., in a case where a contract for Internet communication has not been made with a provider, in a case where a gateway for Internet communication is not functioning, etc.

(Specific Cases; FIG. 12 to 14)

Specific cases of the present embodiment will be described with reference to FIG. 12 to 14. Moreover, in FIG. 12 to 14, reference numbers different from the MFP 10 of FIG. 1 have been assigned, such as MFP 10A, 10B. If there are differences between the MFP of these cases (the MFP 10A, etc.) and the MFP 10 of FIG. 1, these differences will be described before the contents of each case are described.

(Case A; FIG. 12)

In case A, an MFP 10A is capable of executing normal Wi-Fi scan, BT scan, ES, and CS, but is not capable of executing WFD scan. The MFP 10A and the portable terminal 50 are belonging to a normal Wi-Fi NW formed by the AP 100. In the normal Wi-Fi NW, "X1" is used as the SSID, and "Y1" is used as the BSSID. After activating the MFP application, the user of the portable terminal 50 brings the portable terminal 50 closer to the MFP 10A. Consequently, an NFC connection between the portable terminal 50 and the MFP 10A is established. The portable terminal 50 sends a function request to the MFP 10A by using the NFC connection (S10 of FIG. 4).

Upon receiving the function request from the portable terminal 50 (S60 of FIG. 8), the MFP 10A executes the confirmation processes (S70, S80, S90 of FIG. 8), and then generates response data that includes information indicating DS OK, information indicating ES OK, and information indicating CS OK (S100 of FIG. 8). Moreover, since the MFP 10A is not capable of executing WFD scan, but is capable of executing normal Wi-Fi scan and BT scan, the response data includes information indicating DS OK. The response data further includes the network information corresponding to DS (i.e., "X1, Y1, IP1(the normal Wi-Fi IP address of the MFP 10A)", "BT WSI"). The MFP 10A sends the response data to the portable terminal 50 by using the NFC connection (S102 of FIG. 8).

The portable terminal 50 receives the response data from the MFP 10A by using the NFC connection. In the present case, the set of SSID "X1" and BSSID "Y1" included in the response data, and the set of SSID "X1" and BSSID "Y1" included in the normal Wi-Fi WSI of the portable terminal 50 are identical (YES in S31 of FIG. 5), and consequently the portable terminal 50 selects DS (S32 of FIG. 5). The portable terminal 50 sends a selection result indicating DS to the MFP 10A by using the NFC connection (S50 of FIG. 4). According to this, the MFP 10A receives the selection result indicating DS (S104 of FIG. 8).

Then, the portable terminal 50 determines that the set of "X1" and "Y1" of the normal Wi-Fi WSI of the MFP 10A included in the response data, and the set of "X1" and "Y1" of the normal Wi-Fi WSI of the portable terminal 50, are identical (i.e., determines that the MFP 10A and the portable terminal 50 belong to the same normal Wi-Fi NW; S54 of FIG. 4). Consequently, the portable terminal 50 prioritizes the normal Wi-Fi NW to send the scan instruction with, as the destination, the normal Wi-Fi IP address "IP1" of the MFP 10A included in the response data (S54 of FIG. 4). According to this, the portable terminal 50 can send the scan instruction to the MFP 10A via the AP 100.

Upon receiving the scan instruction from the portable terminal 50, the MFP 10A executes a scan process (S110 of FIG. 8), and sends scan data, with the IP address of the portable terminal 50 included in the scan instruction as the destination (S112 of FIG. 8). According to this, the MFP 10A can send the scan data to the portable terminal 50 by using the normal Wi-Fi NW.

As described above, in a case where the MFP 10A and the portable terminal 50 belong to the same normal Wi-Fi NW, the portable terminal 50 can automatically select the appropriate scan function (i.e., DS) from among the three scan functions (i.e., DS, ES, CS) which the MFP 10A is capable of executing. That is, the portable terminal 50 can automatically select the appropriate communication scheme (i.e., the direct scheme) from among the three communication schemes (i.e., direct scheme, E-mail scheme, cloud scheme) which the MFP 10A is capable of using. Next, the portable terminal 50 sends the selection result to the MFP 10A. Consequently, the MFP 10A can appropriately send the scan data to the portable terminal 50 by using the selected communication scheme.

(Case B; FIG. 13)

In case B, an MFP 10B is a device different from the MFP 10A, and is capable of executing normal Wi-Fi scan, WFD scan, BT scan, and CS, but is not capable of executing ES. The MFP 10B belongs to a normal Wi-Fi NW (SSID "X1", BSSID "Y1") formed by an AP 100A. The MFP 10B further belongs as a CL device to a WFD NW (SSID "X3", BSSID "Y3") in which the PC 110 is a G/O device. The portable terminal 50 belongs to a normal Wi-Fi NW (SSID "X2", BSSID "Y2") formed by an AP 100B which is different from the AP 100A.

Processes until the MFP 10B receives a function request are the same as in case A. The MFP 10B generates response data which includes information indicating DS OK, information indicating ES NG, and information indicating CS OK (S100 of FIG. 8). The response data further includes the network information corresponding to DS (i.e., "X1, Y1, IP1 (normal Wi-Fi IP address of the MVP 10B)", "X3, Y3, IP3 (WFD IP address of the MFP 10B)", "BT WSI"). The MFP 10B sends the response data to the portable terminal 50 by using the NFC connection (S102 of FIG. 8).

In the present case, the set of SSID "X1" and BSSID "Y1" included in the response data, and the set of SSID "X2" and BSSID "Y2" included in the normal Wi-Fi WSI of the portable terminal 50 are not identical. Further, the set of SSID "X3" and BSSID "Y3" included in the response data, and the set of SSID "X2" and BSSID "Y2" included in the normal Wi-Fi WSI of the portable terminal 50 are not identical (NO in S31 of FIG. 5). Further, the portable terminal 50 is belonging to a normal Wi-Fi NW (YES in S33). Upon sending a signal to the confirmation server 130, the portable terminal 50 can receive a response signal from the confirmation server 130 (YES in S34). Consequently, the portable terminal 50 executes the first selection process (S150).

In the first selection process (FIG. 6), CS and ES are prioritized over DS. Since the response data includes information indicating DS OK and CS OK, the portable terminal 50 selects CS from the two scan functions (i.e., DS, CS) which the MFP 10B is capable of executing (S152 of FIG. 6). The portable terminal 50 sends the selection result indicating CS, and a URL "C1" of the scan CL server 150, which is the scan data destination, to the MFP 10B by using the NFC connection (S50 of FIG. 4).

Upon receiving the selection result indicating CS and the URL "C1", the MFP 10B executes the scan process (S110 of FIG. 8), sending the scan data to the scan CL server 150 via the wireless LAN I/F 20 (S112). In the present case, the scan data is sent to the scan CL server 150 via the AP 100A.

The portable terminal 50 receives the scan data from the scan CL server 150 via the wireless LAN I/F 60 (S58 of FIG. 4). More specifically, since the portable terminal 50 is belonging to the normal Wi-Fi NW, the portable terminal 50 receives the scan data from the scan CL server 150 by using the normal Wi-Fi NW (i.e., the AP 100B).

As described above, in the case where the portable terminal 50 is belonging to the normal Wi-Fi NW, the portable terminal 50 can appropriately select CS from the two scan functions (i.e., DS, CS) which the MFP 10B is capable of executing. According to this, the portable terminal 50 does not need to newly establish a wireless connection with the MFP 10B, and so the processing load of the portable terminal 50 can be reduced. Further, since the portable terminal 50 is using the normal Wi-Fi NW, and not a cellular NW, the communication of scan data is not subject to being charged for.

(Case C; FIG. 14)

In case C, the MFP 10B is the same device as the MFP 10B of case B, and is capable of executing normal Wi-Fi scan, WFD scan, BT scan, and CS, but is not capable of executing ES. The MFP 101B belongs to a normal Wi-Fi NW (SSID "X1", BSSID "Y1") formed by the AP 100, but is not belonging to a WFD NW. The portable terminal 50 belongs to a cellular NW, but does not belong to a wireless LAN (i.e., a normal Wi-Fi NW, a WFD NW).

Processes until the MFP 10B receives a function request are the same as in case A. At the time the MFP 10B receives a function request, the MFP 10B is not belonging to a WFD NW (i.e., the state of the MFP 10B is the device state). Consequently, the MTP 10B moves from the device state to the G/O state, newly forms a WFD NW, and generates WFD WSI (i.e., "X3", "Y3", "IP3", "PW") (S100 of FIG. 8). "X3", "Y3", "IP3", "PW" are respectively the SSID, BSSID, WFD IP address of the MFP 10B, and the password within this WFD WSI.

The response data sent to the portable terminal 50 from the MFP 10B includes information indicating DS OK, information indicating ES NG, and information indicating CS OK. The response data further includes the network information corresponding to DS (i.e., "X1, Y1, IP1", "X3, Y3, IP3, PW", "BT WSI").

In the present case, neither the normal Wi-Fi WSI nor the WFD WSI of the portable terminal 50 is being stored in the memory 74 (NO in S31 of FIG. 5). Further, the portable terminal 50 belongs to the cellular NW (YES in S38 of FIG. 5), but does not belong to a wireless LAN (NO in S33 of FIG. 5). Consequently, the portable terminal 50 executes the second selection process (S160).

In the second selection process (FIG. 7), DS is prioritized over CS and ES. Since the response data includes information indicating DS OK and CS OK, the portable terminal 50 selects DS from among the two scan functions (i.e., DS, CS) which the MFP 10B is capable of executing (S162 of FIG. 7). The portable terminal 50 sends a selection result indicating DS to the MFP 10B by using the NFC connection (S50 of FIG. 4).

The portable terminal 50 determines that, as the MFP 10B and the portable terminal 50 are not belonging to the same NW, it is not possible to receive scan data by using the normal Wi-Fi NW (S54 of FIG. 4). The portable terminal 50 determines to prioritize utilization of the WFD WSI which, of the WFD WSI and BT WSI included in the destination information, corresponds to the WFD communication having a faster communication speed (i.e., determines to receive the scan data by using the WFD NW) (S54). That is, the portable terminal 50 sends a connection request, to participate in the WFD NW in which the MFP 10B is a G/O device, to the MFP 10B via the wireless LAN I/F 60 (S54). According to this, a wireless connection between the MFP 10B and the portable terminal 50 is established, and the portable terminal 50 can participate in the WFD NW as a CL device.

Next, the portable terminal 50 sends a scan instruction, with the WFD IP address "IP3" of the MFP 1013 included in the response data as the destination (S54). According to this, the portable terminal 50 can send the scan instruction to the MFP 10B not via another device.

Upon receiving the scan instruction from the portable terminal 50, the MFP 10B executes the scan process (S110 of FIG. 8), and sends scan data, with the IP address of the portable terminal 50 included in the scan instruction as the destination (S112 of FIG. 8). According to this, by using the WFD NW, the MFP 10B can send the scan data to the portable terminal 50 not via another device.

As described above, in a case where the portable terminal 50 belongs to a cellular NW but does not belong to a wireless LAN, the portable terminal 50 can appropriately select DS from among the two scan functions (i.e., DS, CS) which the MFP 10B is capable of executing. According to this, since the portable terminal 50 is using the WFD NW, and not a cellular NW, the communication of scan data is not subject to being charged for.

(Corresponding Relationships)

The portable terminal 50 and the MFP 10 are respectively examples of the "terminal apparatus" and the "function executing apparatus". In case A of FIG. 12, the three communication schemes DS, ES, and CS are an example of the "M1 items of communication schemes", and DS is an example of the "particular communication scheme". In case B of FIG. 13, the two communication schemes DS and CS are an example of the "M1 items of communication schemes", and CS is an example of the "particular communication scheme". In case C of FIG. 14, the two communication schemes DS and CS are an example of the "M1 items of communication schemes", and DS is an example of the "particular communication scheme".

Moreover, the MFP 10A of case A of FIG. 12, and the MFP 10B of case B of FIG. 13 can also be considered as an example of the "first function executing apparatus" and the "second function executing apparatus" respectively. In this case, in case B, the two communication schemes DS and CS are an example of the "M2 items of communication schemes", and CS is an example of the "different communication scheme which is different from the particular communication scheme".

The NFC I/F 62 and the wireless LAN I/F 60 are respectively examples of the "first interface" and the "second interface". The response data of case A of FIG. 12, and the response data of case B of FIG. 13 are respectively examples of the "first information" and the "second information". CS, DS, the scanning CSI and the confirmation server 130 are respectively examples of the "first communication scheme", the "second communication scheme", the "first communication setting information" and the "server". The normal Wi-Fi NW of case A is an example of the "particular local area network".

The information included in the response data of case A (i.e., DS OK, ES OK, CS OK) is an example of the "first data". Further, in case A, if the scanning CSI is not being stored in the MFP 10A (NO in S92 of FIG. 11), the response data indicates DS OK, ES OK, and CS NG. Further, in case A, if the MFP 1 OA is not capable of communicating with the confirmation server 130 (NO in S93 of FIG. 11), the response data indicates DS OK, ES OK, and CS NG. The information (i.e., DS OK, ES OK, CS NG) included in the response data of these cases is an example of the "second data".

The process S12, the process S30, and the process S50 of FIG. 4 are respectively examples of the "receiving first information", the "selecting", and the "sending". The processes S56 and S58 are an example of the "receiving the particular scan data".

(Second Embodiment)

Points differing from the first embodiment will be described. In the present embodiment, the portable terminal 50 can execute a function confirmation process (to be described, S15 of FIG. 4), limiting the type of scan functions capable of being selected by the portable terminal 50.

(Application Process of Portable Terminal 50; FIG. 4)

In the present embodiment, the response data received in S12 further includes a device ID of the MFP 10 (see S100 of FIG. 8). The device ID is a unique ID assigned to the MFP 10 by the vendor of the MFP 10. Next, the CPU 72 executes the function confirmation process of S15. As will be described in detail later, in the function confirmation process, information (DS OK, ES OK, CS OK) written in the response data can be changed (see FIG. 15). Consequently, it is possible to limit the types of scan functions selected in the function selection process of S30, i.e., the types of scan functions that can be selected by the portable terminal 50.

Further, in a case where ES is selected in S30, in S50 the CPU 72 sends the E-mail address of the portable terminal 50 to the MFP 10 as the E-mail address of the scan data destination without sending an E-mail address of a device different from the portable terminal 50 to the MFP 10. That is, in the present embodiment, it is assumed that, in a case where ES is selected by the portable terminal 50, the sending of scan data is executed from the MFP 10 to the portable terminal 50 via the mail server 120. This point is different from the first embodiment.

Further, in a case where CS is selected in S30, in S50 the CPU 72 sends the URL of the scan CL server 150 to the MFP 10 as the URL of the scan data destination without sending a URL of the data storage CL server 160 to the MFP 10. That is, in the present embodiment, it is assumed that, in a case where CS is selected by the portable terminal 50, the sending of scan data is executed from the MFP 10 to the portable terminal 50 via the scan CL server 150. This point is different from the first embodiment.

(Function Confirmation Process of Portable Terminal 50; FIG. 15)

The function confirmation process of S15 of FIG. 4 will be described with reference to FIG. 15. In S402, the CPU 72 determines whether information indicating DS OK is included in the response data. In a case where information indicating DS OK is included in the response data, the CPU 72 determines YES in S402, and proceeds to S404. On the other hand, in a case where information indicating DS NG is included in the response data, the CPU 72 determines NO in S402, and proceeds to S412.

In S404, the CPU 72 determines whether the MFP 10 and the portable terminal 50 are belonging to the same normal Wi-Fi NW or the same WFD NW. In a case where either the normal Wi-Fi WSI or the WFD WSI of the portable terminal 50 is not being stored in the memory 74, the CPU 72 determines NO in S404, and proceeds to S406.

In a case where the normal Wi-Fi WSI of the portable terminal 50 is being stored in the memory 74, the CPU 72 determines whether a set of SSID and BSSID (called "first set" below) which is identical to the set of normal Wi-Fi SSID and normal Wi-Fi BSSID included in the normal Wi-Fi WSI, is included in the response data. In a case where the first set is included in the response data, the CPU 72 determines YES in S404, and proceeds to S412, and in a case where the first set is not included in the response data, the CPU 72 determines NO in S404, and proceeds to S406.

Further, in a case where the WFD WSI of the portable terminal 50 is being stored in the memory 74, the CPU 72 determines whether a set of SSID and BSSID (called "second set" below) which is identical to the set of WFD SSID and WFD BSSID of that WFD WSI, is included in the response data. In a case where the second set is included in the response data, the CPU 72 determines YES in S404, and proceeds to S412, and in a case where the second set is not included in the response data, the CPU 72 determines NO in S404, and proceeds to S406.

In S406, the CPU 72 determines whether the password of the WFD WSI of the MFP 10 is included in the response data. As described above, in a case where the MFP 10 is in the G/O state, the response data includes the password of the WFD WSI of the MFP 10 (see S100 of FIG. 8). In a case where the password is included in the response data, the CPU 72 determines YES in S406, and proceeds to S412, and in a case where the password is not included in the response data, the CPU 72 determines NO in S406, and proceeds to S408.

In S408, the CPU 72 determines whether the BT WSI of the MFP 10 is included in the response data. In a case where the BT WSI is included in the response data, the CPU 72 determines YES in S408, and proceeds to S412, and in a case where the BT WSI is not included in the response data, the CPU 72 determines NO in S408, and proceeds to S410.

In a case where NO is determined in any of S404, S406, and S408, a LAN to which both the MFP 10 and the portable terminal 50 are belonging is not realized, and consequently the MFP 10 and the portable terminal 50 cannot communicate scan data by using the direct communication scheme. Consequently, in S410, the CPU 72 changes the information indicating DS OK included in the response data received in S12 of FIG. 4 to information indicating DS NG. According to this, in S30 of FIG. 4, the CPU 72 cannot select DS. When S410 ends, processing proceeds to S412.

In S412, the CPU 72 determines whether information indicating ES OK is included in the response data. In a case where information indicating ES OK is included in the response data, the CPU 72 determines YES in S412, and proceeds to S414. On the other hand, in a case where information indicating ES NG is included in the response data, the CPU 72 determines NO in S412, and proceeds to S418.

In S414, the CPU 72 determines whether the receiving ESI, which is the ESI for receiving E-mail, is being stored in the memory 74. In a case where the sending ESI is being stored in the memory 74, the CPU 72 determines YES in S414, and proceeds to S418, and in a case where the sending ESI is not being stored in the memory 74, the CPU 72 determines NO in S414, and proceeds to S416.

As described above, in the present embodiment, in a case where ES is selected by the portable terminal 50, it is assumed that the sending of scan data is executed from the MFP 10 to the portable terminal 50 via the mail server 120. Then, in a case where NO is determined in S414, the portable terminal 50 cannot receive E-mail, and consequently cannot receive E-mail including scan data from the MFP 10. That is, the MFP 10 and the portable terminal 50 cannot communicate scan data by using the E-mail communication scheme. Consequently, in S416, the CPU 72 changes the information indicating ES OK included in the response data received in S12 of FIG. 4 to information indicating ES NG. According to this, the CPU 72 cannot select ES in S30 of FIG. 4. When S416 ends, processing proceeds to S418.

In S418, the CPU 72 determines whether information indicating CS OK is included in the response data. In a case where information indicating CS OK is included in the response data, the CPU 72 determines YES in S418, and proceeds to S420. On the other hand, in a case where information indicating CS NG is included in the response data, the CPU 72 determines NO in S418, and ends the function confirmation process.

As described above, the response data received in S12 of FIG. 4 includes the device ID of the MFP 10. In S420, the CPU 72 sends an inquiry signal that includes the device ID of the MFP 10 to the confirmation server 130 via the wireless LAN I/F 60 or another I/F (e.g., the cellular NW I/F 66).

Upon receiving the inquiry signal that includes the device ID of the MFP 10, the confirmation server 130 determines whether a connection between the MFP 10 and the scan CL server 150 is established. For example, the confirmation server 130 supplies the device ID of the MFP 10 to the scan CL server 150, and acquires information from the scan CL server 150 indicating whether or not there is the connection. Then, the confirmation server 130 sends an inquiry result to the MFP 10 indicating connection or no-connection in accordance with the acquired information.

In S422, the CPU 72 determines whether the inquiry result received from the confirmation server 130 indicates connection. In a case where the inquiry result indicates connection, the CPU 72 determines YES in S422, and ends the function confirmation process, and in a case where the inquiry result indicates no-connection, the CPU 72 determines NO in S422, and proceeds to S424.

As described above, in the present embodiment, in a case where CS is selected by the portable terminal 50, it is assumed that the sending of scan data is executed from the MFP 10 to the portable terminal 50 via the scan CL server 150. In order to send scan data to the scan CL server 150, the MFP 10 must be constantly connected with the scan CL server 150. Consequently, in a case where NO is determined in S422, the MFP 10 cannot send scan data to the scan CL server 150. That is, the MFP 10 and the portable terminal 50 cannot communicate scan data by using the cloud communication scheme. Consequently, in S424, the CPU 72 changes the information indicating CS OK included in the response data received in S12 of FIG. 4 to information indicating CS NG. According to this, the CPU 72 cannot select CS in S30 of FIG. 4. When S424 ends, the function confirmation process ends.

(Specific Case; FIG. 16)

A specific case realized by processes of FIG. 4 (particularly S15) and FIG. 8 will be described with reference to FIG. 16. An MFP 10C is capable of executing normal Wi-Fi scan, BT scan, ES, and CS, and is not capable of executing WFD scan. The MFP 10C and the portable terminal 50 are belonging to a normal Wi-Fi NW (SSID "X1", BSSID "Y1") formed by the AP 100.

In the present case, the response data sent from the MFP 10C to the portable terminal 50 includes a device ID of the MFP 10C, information indicating DS OK, information indicating ES OK, information indicating CS OK, and the network information corresponding to DS (i.e., "X1, Y1, IP1", "BT WSI") (S100 of FIG. 8).

Since the response data does not include a set of SSID and BSSID identical to the set of "X1" and "Y1" of the normal Wi-Fi NW to which the portable terminal 50 belongs (YES in S404 of FIG. 15), the portable terminal 50 does not change the information indicating DS OK to information indicating DS NG.

In the present case, the receiving ESI, for executing the receiving of E-mail, is not being stored in the memory 74 of the portable terminal 50 (NO in S414 of FIG. 15), and consequently the portable terminal 50 changes the information indicating ES OK to information indicating ES NG (S416).

The portable terminal 50 sends an inquiry signal that includes the device ID of the MFP 10C to the confirmation server 130, and acquires an inquiry result from the confirmation server 130 (S422 of FIG. 15). In the present case, the scanning CSI is being stored in the memory 34 of the MFP 10C, but the MFP 10C is not connected with the scan CL server 150. For example, in a case where an expiration date of the authentication information included in the scanning CSI has expired, a case may happen where the MFP 10C cannot connect with the scan CL server 150. In this case, the portable terminal 50 determines NO in S422 of FIG. 15, and changes the information indicating CS OK to information indicating CS NG (S424)

As described above, the response data received from the MFP 10C includes information indicating DS OK, ES OK, and CS OK. However, in the function confirmation process (S15 of FIG. 4), the above information is changed to information indicating DS OK, information indicating ES NG, and information indicating CS NG. Consequently, the portable terminal 50 selects DS from among the three scan functions (i.e., DS, ES, CS) which the MFP 10C is capable of executing. Then, as in case A (FIG. 12), the portable terminal 50 prioritizes use of the normal Wi-Fi NW to send a scan instruction to the MFP 10C via the AP 100 (S54 of FIG. 4).

Upon receiving the scan instruction from the portable terminal 50 (S108 of FIG. 8), the MFP 10C executes the scan process (S110), and sends the scan data to the portable terminal 50 by using the normal Wi-Fi NW (S112).

According to the present embodiment, it is possible to prevent the portable terminal 50 selecting a communication scheme which cannot be used to send scan data from the MFP 10C to the portable terminal 50 (ES and CS in the case of FIG. 16). In the present embodiment, the MFP 10C and the portable terminal 50 can appropriately execute the communication of scan data by using the communication scheme selected by the portable terminal 50 (DS in the case of FIG. 16).

(Corresponding Relationships)

In the case of FIG. 16, the SSID "X1" and the BSSID "Y1" included in the response data are an example of the "identification information". CS, DS, ES are respectively examples of the "first communication scheme", the "second communication scheme", and the "third communication scheme". The information included in the response data (i.e., DS OK, ES OK, CS OK) is an example of the "third data" and the "fourth data". The process of S404 and the process of S414 of FIG. 15 are respectively examples of the "determining . . . whether the terminal apparatus is belonging to the particular local area network" and the "determining whether second communication setting information . . . is stored in the memory of the terminal apparatus". The receiving ESI, which is the determination target of S414, is an example of the "second communication setting information".

(Third Embodiment)

Points different from the first embodiment will be described. In the present embodiment, the MFP 10 executes the function selection process without the portable terminal 50 executing the function selection process.

(Application Process of Portable Terminal 50; FIG. 17)

The contents of a process realized by the MFP application of the present embodiment will be described with reference to FIG. 17. A function request sent in S10-3 includes information indicating whether the portable terminal 50 is belonging to a wireless LAN, and information indicating whether the portable terminal 50 is belonging to a cellular NW. In a case where the portable terminal 50 is belonging to a wireless LAN (i.e., in a case where the normal Wi-Fi WSI or WFD WSI is being stored in the memory 74), the function request further includes the set of SSID and BSSID of that wireless LAN. The MFP 10 can execute a function selection process (to be described, S30 of FIG. 18) by using this information.

The response data received in S12-3 includes the selection result (i.e., DS, ES, or CS) of the function selection process executed by the MFP 10. In a case where the response data includes a selection result indicating DS, the response data further includes the network information corresponding to DS (i.e., the information included in the normal Wi-Fi WSI of the MFP 10, the information included in the WFD WSI of the MFP 10, the BT WSI of the MFP 10).

Thus, in the present embodiment, the CPU 72 executes one round trip of communication which is sending a function request (S10-3) and receiving response data such as DS OK, etc., (S12-3). That is, the CPU 72 executes one round trip of communication in one session of a NFC connection. Upon ending S12-2, the NFC connection is disconnected.

The processes S52 to S56 are the same as S52 to S56 of FIG. 4. In a case where the selection result indicates ES or CS (NO in S52), in S57 the CPU 72 sends the destination information to the MFP 10 via the NFC I/F. In a case where the selection result indicates ES, the destination information is the E-mail address of the scan data destination. In a case where the selection result indicates CS, the destination information is the URL of the scan data destination. The process of S58 is the same as the process of S58 of FIG. 4.

(Process of MFP; FIG. 18)

Contents of a process executed by the MFP 10 of the present embodiment will be described with reference to FIG. 18. S60 to 90 are the same as S60 to 90 of FIG. 8. However, as described above, the function request received in S60 includes information indicating whether the portable terminal 50 is belonging to a wireless LAN, and information indicating whether the portable terminal 50 is belonging to a cellular NW. Further, the function request may include the set of SSID and BSSID of the wireless LAN to which the portable terminal 50 is belonging. Further, in S70, in a case where at least one of normal Wi-Fi scan, WFD scan, and BT scan is OK, the CPU 32 stores information indicating DS OK in the memory 34, and in a case where all of normal Wi-Fi scan, WFD scan, and BT scan are NG, the CPU 32 stores information indicating DS NG in the memory 34.

In S30, the CPU 32 executes the function selection process. Apart from the point that an executing body is the CPU 32, the function selection process of the present embodiment is the same as the function execution process of the first embodiment (see S30 of FIG. 4, FIG. 5 to FIG. 7). Moreover, in a case where a set of SSID and BSSID is included in the function request, the CPU 32 executes the process of S31 of FIG. 5 by using that set. Further, the CPU 32 executes the processes of S33 and S38 of FIG. 5 by using the information included in the function request (i.e., information indicating whether the portable terminal 50 is belonging to a wireless LAN, information indicating whether the portable terminal 50 is belonging to a cellular NW).

Next, in S50-3, the CPU 32 sends response data which includes the selection result of the function selection process of S30 to the portable terminal 50 via the NFC I/F 22. In a case where the selection result indicates DS, the CPU 32 further sends, to the MFP 10, response data which includes network information corresponding to DS. The method of preparing the network information corresponding to DS is the same as the method of preparing the network information corresponding to DS in S100 of FIG. 8 of the first embodiment. For example, in a case where the CPU 32 is in the WFD device state, the CPU 32 moves to the G/O state, newly forms a WFD NW, and generates WFD WSI.

The processes of S106, S108, S110, S112 are respectively the same as the processes of S106, S108, S110, S112 of FIG. 8. In S109, the CPU 32 receives the destination information (i.e., the E-mail address (or URL) of the scan data destination) from the portable terminal 50 via the NFC I/F 22.

(Specific Case; FIG. 19)

A specific case realized by the processes of FIG. 17 and FIG. 18 will be described with reference to FIG. 19. An MFP 10D is capable of executing normal. Wi-Fi scan, WFD scan, BT scan, ES, and CS. The MFP 10D and the portable terminal 50 are belonging to a normal Wi-Fi NW (SSID "X1", BSSID "Y1") formed by the AP 100. Moreover, the portable terminal 50 is not belonging to a cellular NW.

In the present case, a function request sent from the portable terminal 50 to the MFP 10D includes information indicating that the portable terminal 50 is belonging to a wireless LAN, information indicating that the portable terminal 50 is not belonging to a cellular NW, and the set of SSID "X1" and BSSID "Y1" of the normal Wi-Fi NW to which the portable terminal 50 is belonging (S10-3 of FIG. 17).

Upon receiving the function request from the portable terminal 50 (S60 of FIG. 18), the MFP 10D executes the function confirmation processes (S70 to 90 of FIG. 18), and stores information indicating DS OK, information indicating ES OK, and information indicating CS OK in the memory 34.

In the present case, since the function request includes a set of SSID and BSSID identical to the set of SSID "X1" and BSSID "Y1" included in the normal Wi-Fi WSI of the MFP 10D (YES in S31 of FIG. 4), the MFP 10D selects DS from among the three scan functions (i.e., DS, ES, CS) which the MFP 10D is capable of executing (S32 of FIG. 5).

In the course of preparing the network information corresponding to DS, the MFP 10D moves from the device state to the G/O state, newly forms a WFD NW, and generates WFD WSI (i.e., "X3, Y3, IP3, PW") (S50-3 of FIG. 18). Thereupon, the response data sent to the portable terminal 50 from the MFP 10D includes the selection result indicating DS, and the network information corresponding to DS (normal Wi-Fi WSI (i.e., "X1, Y1, IP1"), WFD WSI (i.e., "X3, Y3, IP3, PW"), BT WSI) (S50-3 of FIG. 18).

Upon receiving the selection result indicating DS and the network information corresponding to DS, the portable terminal 50 determines that the portable terminal 50 and the MFP 10D are belonging to the same normal Wi-Fi NW, and prioritizes use of the normal Wi-Fi NW to send a scan instruction to the MFP 10D via the AP 100 (S54 of FIG. 17).

Upon receiving the scan instruction from the portable terminal 50 (S108 of FIG. 18), the MFP 10D executes the scan process (S110), and sends the scan data to the portable terminal 50 via the AP 100 by using the normal Wi-Fi NW (S112).

(Corresponding Relationships)

In the case of FIG. 19, the SSID "X1" and BSSID "Y1" included in the function request are an example of the "identification information". DS, ES, and CS are an example of the "M1 items of communication schemes", and DS is an example of the "particular communication scheme". The process S60, the process S30, the process S50-3, the process S109, and the process S112 of FIG. 18 are respectively examples of the "receiving first information", the "selecting", the "receiving identification information", the "receiving particular destination information", and the "sending particular scan data", (Fourth Embodiment)

Points different from the third embodiment will be described. In the present embodiment, the MFP 10 executes the DS function confirmation process of S70 of FIG. 18 in accordance with a flowchart different from that of FIG. 9.

(DS Function Confirmation Process; FIG. 20)

The DS function confirmation process of S70 of FIG. 18 will be described with reference to FIG. 20. As described above, in a case where the portable terminal 50 is belonging to at least one NW among the normal Wi-Fi NW and the WFD NW, the function request received in S60 of FIG. 18 includes the set of SSID and BSSID of at least one NW.

S700, S702 are the same as S71, S73 of FIG. 9. In S704, the CPU 32 determines whether the MFP 10 and the portable terminal 50 are belonging to the same normal Wi-Fi NW. In a case where the normal Wi-Fi WSI of the MFP 10 is not being stored in the memory 34, the CPU 32 determines NO in S704, and proceeds to S708.

In a case where the normal Wi-Fi WSI of the MFP 10 is being stored in the memory 34, the CPU 32 determines whether a set of SSID and BSSID (called "third set" below) which is identical to the set of normal Wi-Fi SSID and normal Wi-Fi BSSID included in the normal Wi-Fi WSI, is included in the function request. In a case where the third set is included in the function request, the CPU 32 determines YES in S704, and proceeds to S706, and in a case where the third set is not included in the function request, the CPU 32 determines NO in S704, and proceeds to S708.

In S706, the CPU 32 stores information indicating normal Wi-Fi scan OK in the memory 34. Further, in S708, the CPU 32 stores information indicating normal Wi-Fi scan NG in the memory 34. When S706 or S708 ends, processing proceeds to S710.

S710, S718 are the same as S74, S76 of FIG. 9. In S712, the CPU 32 determines whether the current state of the MFP 10 is the CL state. In a case where the current state of the MFP 10 is the CL state, the CPU 32 determines YES in S712, and proceeds to S714, and in a case where the current state of the MFP 10 is the G/O state or device state, the CPU 32 determines NO in S712, and proceeds to S716.

In S714, the CPU 32 determines whether the MFP 10 and the portable terminal 50 are belonging to the same WFD NW. In a case where the WFD WSI of the MFP 10 is being stored in the memory 34, the CPU 32 determines whether a set of SSID and BSSID (called "fourth set" below) which is identical to the set of WFD SSID and WFD BSSID included in the WFD WSI is included in the function request. In a case where the fourth set is included in the function request, the CPU 32 determines YES in S714, and proceeds to S716, and in a case where the fourth set is not included in the function request, the CPU 32 determines NO in S714, and proceeds to S718. S716 to S724 are the same as S75 to S79 of FIG. 9.

In a case where the MFP 10 and the portable terminal 50 are not belonging to the same normal Wi-Fi NW, the MFP 10 and the portable terminal 50 cannot execute communication of scan data by using the normal Wi-Fi scheme. This is because the password included in the normal Wi-Fi WSI of the MFP 10 is not sent to the portable terminal 50 from the MFP 10 (S50-3 of FIG. 18), and consequently the portable terminal 50 cannot participate in the normal Wi-Fi NW to which the MFP 10 is belonging. Consequently, in the present embodiment, even if the MFP 10 has the normal Wi-Fi scan function, in a case where the MFP 10 and the portable terminal 50 are not belonging to the same normal Wi-Fi NW (NO in S704), the MFP 10 stores normal Wi-Fi scan NG in the memory 34 (S708).

In a case where the MFP 10 is in the CL state and the MFP 10 and the portable terminal 50 are not belonging to the same WFD NW, the MFP 10 and the portable terminal 50 cannot execute communication of scan data by using the WFD scheme. This is because the password included in the WFD WSI of the MFP 10 is not sent from the MFP 10 to the portable terminal 50 (S50-3 of FIG. 18), and consequently the portable terminal 50 cannot participate in the WFD NW to which the MFP 10 is belonging. Consequently, in the present embodiment, even if the MFP 10 has the WFD scan function, in a case where the MFP 10 is in the CL state and the MFP 10 and the portable terminal 50 are not belonging to the same WFD NW (NO in S714), the MFP 10 stores WFD scan NG in the memory 34 (S718).

Thus, in the present embodiment, the MFP 10 can be caused to appropriately store information relating to the normal Wi-Fi scan (OK or NG), and information relating to WFD scan (OK or NG) in the memory 34 in accordance with the situation of the MFP 10 and the portable terminal 50. Consequently, in S30 of FIG. 18 the MFP 10 can appropriately execute the selection relating to DS.

(Specific Case; FIG. 21)

A specific case realized by the processes of FIG. 17 and FIG. 18 (particularly S70 (FIG. 20)) will be described with reference to FIG. 21. An MFP 10E of FIG. 21 is belonging to a normal Wi-Fi NW (SSID "X1", BSSID "Y1") formed by the AP 100. Further, the MFP 10E belongs, as a CL device, to a WFD NW (SSID "X3", BSSID "Y3") formed by the PC 110. The MFP 10E is capable of executing ES and CS, but is not capable of executing BT scan. The portable terminal 50 is not belonging to a wireless LAN, but is belonging to a cellular NW.

In the present case, a function request sent from the portable terminal 50 to the MFP 10E includes information indicating that the portable terminal 50 is not belonging to a wireless LAN, and information indicating that the portable terminal 50 is belonging to a cellular NW.

Since the function request does not include a set identical to the set of normal Wi-Fi SSID "X1" and normal Wi-Fi BSSID "Y1" included in the normal Wi-Fi WSI of the MFP 10E (NO in S704 of FIG. 20), the MFP 1E stores information indicating normal Wi-Fi scan NG in the memory 34 (S708). Further, since the MFP 10E has the CL state (YES in S712) and, further, the function request does not include a set identical to the set of WFD SSID "X3" and WFD BSSID "Y3" included in the WFD WSI of the MFP 10E (NO in S714), the MFP 10E stores information indicating WFD scan NG in the memory 34 (S718). Further, since the MFP 10E is not capable of executing BT scan (NO in S720), the MFP 10E stores information indicating BT scan NG in the memory 34 (S724).

Since all of normal Wi-Fi scan, WFD scan, and BT scan are NG, the MFP 10E stores information indicating DS NG in the memory 34. Thus, the MFP 10E stores information indicating DS NG in the memory 34 despite being capable of executing normal Wi-Fi scan and WFD scan. Consequently, in the second selection process (to be described, see FIG. 7), the MFP 10F does not select DS, which is not available to the MFP 10E to execute the communication of scan data.

Since the MFP 10E is capable of executing ES, the MFP 10E stores information indicating ES OK in the memory 34 (S83 of FIG. 10). Further, since the MFP 10E is capable of executing CS, the MFP 10E stores information indicating CS OK in the memory 34 (S94 of FIG. 10).

As described above, the function request includes information indicating that the portable terminal 50 is belonging to a cellular NW. Consequently, the MFP 10E determines YES in S38 of FIG. 5, and executes the second selection process (S160). Then, the MFP 10E selects CS from among the two scan functions (ES, CS) which the MFP 10E is capable of executing (YES in S163 of FIG. 7). The MFP 10E sends, to the portable terminal 50, response data which includes the selection result indicating CS.

Upon receiving the response data from the MFP 10E (S12-3 of FIG. 17), the portable terminal 50 sends the destination information including the URL "C1" of the scan CL server 150, which is the scan data destination, to the portable terminal 50 (S57 of FIG. 17).

Upon receiving the destination information (i.e., URL "C1") from the portable terminal 50 (S109 of FIG. 18), the MFP 10E executes the scan process (S110), and sends scan data to the scan CL server 150 (S112).

The portable terminal 50 receives the scan data from the scan CL server 150 via the cellular NW I/F 66 (S58 of FIG. 17).

(Corresponding Relationships)

In the case of FIG. 21, DS is an example of the "second communication scheme". The URL "C1" of the scan CL server 150 is an example of the "particular destination information". The process S60 of FIG. 18 is an example of the "receiving identification information". The processes of S704 and S714 of FIG. 20 are an example of the "determining . . . whether the function executing apparatus is belonging to the particular local area network", (Variant 1)

In S93 of FIG. 11, the CPU 32 of the MFP 10 stores information indicating CS OK or information indicating CS NG in the memory 34 by determining whether the MFP 10 is capable of communicating with the confirmation server 130 on the Internet. Instead, the CPU 32 may determine YES in S93 in a case where the MFP 10 is connected with the AP 100 (i.e., in a case where the normal Wi-Fi WSI is being stored in the memory 34), and may determine NO in S93 in a case where the MFP 10 is not connected with the AP 100 (i.e., in a case where the normal Wi-Fi WSI is not being stored in the memory 34). The AP 100 usually comprises a function of relaying communication between the wireless LAN and the Internet. Consequently, in a case where the MFP 10 is connected with the AP 100, the MFP 10 is usually capable of executing Internet communication. Consequently, by determining whether the MFP 10 is connected with the AP 100, the CPU 32 can appropriately determine whether the MFP 10 is capable of executing Internet communication (i.e., whether the MFP 10 is capable of communicating with the scan CL server 150 and/or data storage CL server 160).

(Variant 2)

In S12 of FIG. 4, instead of receiving response data which includes information indicating DS OK, etc., the CPU 72 of the portable terminal 50 may receive response data which includes the device ID or model name of the MFP 10. In this case, the CPU 72 sends an inquiry signal that includes the device ID or a model name of the MFP 10 to the confirmation server 130, and receives an inquiry result from the confirmation server 130. The confirmation server 130 is storing, in association with the device ID or model name of the MFP 10, information indicating which scan functions (DS, ES, CS) the MFP 10 is capable of executing. The information is stored in advance in the confirmation server 130 by the vendor of the MFP 10. For example, in a case where the MFP 10 does not have the ES function and the CS function, the vendor stores information indicating DS OK, ES NG, and CS NG in the confirmation server 130 in association with the device ID or model name of the MFP 10. In case of receiving an inquiry signal, from the portable terminal 50, that includes the device ID or model name of the MFP 10, the confirmation server 130 sends an inquiry result, to the portable terminal 50, that includes information indicating which scan functions (DS, ES, CS) the MFP 10 is capable of executing. The CPU 72 of the portable terminal 50 selects the scan function in S30 of FIG. 4 in accordance with the inquiry result. In the present variant, also, the CPU 72 can select the scan functions which the MFP 10 is capable of executing. In the present variant, the device ID or model name of the MFP 10 is an example of the "first information".

(Variant 3)

In variant 2, the confirmation server 130 may further store scan conditions which the MFP 10 is capable of executing (e.g., a range of scan resolutions which the MFP 10 is capable of using, etc.) in association with the device ID or model name of the MFP 10. Then, in case of receiving an inquiry signal that includes the device ID or model name of the MFP 10 from the portable terminal 50, the confirmation server 130 sends an inquiry result, to the portable terminal 50, that includes information indicating whether the MFP 10 is capable of executing any scan functions (DS, ES, CS), and information indicating the scan conditions which the MFP 10 is capable of executing. In accordance with the inquiry result, the CPU 72 of the portable terminal 50 generates display data indicating the scan conditions included in the inquiry result, and supplies the display data to the display mechanism 54. According to this, the user can select the scan conditions.

In S50 of FIG. 4, the CPU 72 may send, to the MFP 10, a selection result which indicates not only the scan function (e.g., "DS") selected by the CPU 72, but also the scan conditions selected by the user (e.g., scan resolution "200 Dpi"). Then, in S110 of FIG. 8, the CPU 32 of the MFP 10 may execute the scan process in accordance with the scan conditions indicated by the selection result of the portable terminal 50.

(Variant 4)

The "first interface" is not limited to the NFC I/F 62, but may be e.g., a TJ I/F for executing a Transfer Jet wireless communication. Moreover, in case of intending to speed up a communication speed of Transfer Jet wireless communication, the communication speed of a wireless communication via the wireless LAN I/F 60 may be slower than the communication speed of a wireless communication via the TJ I/F. That is, the communication speed of a wireless communication via the "second interface" may be faster than, or slower than, the communication speed of a wireless communication via the "first interface". In general terms, it is sufficient for a communicable range of wireless communication via the "second interface" to be greater than a communicable range of wireless communication via the "first interface".

(Variant 5)

The "function executing apparatus" is not limited to the MFP 10, but may be another communication apparatus capable of executing the scan function (scanner, FAX apparatus, copier, etc.).

(Variant 6)

In the above embodiments, the wireless network is formed by the MFP 10 and the portable terminal 50 executing WFD communication. Instead, by activating a so-called Soft AP, the CPU 32 of the MFP 10 may form a wireless network in which the MFP 10 operates as an AP.

(Variant 7)

In the above embodiments, when a WFD NW is to be newly formed, the MFP 10 becomes the G/O device. Instead, the portable terminal 50 may become the G/O device. Further, by activating a so-called Soft AP, the CPU 72 of the portable terminal 50 may form a wireless network in which the portable terminal 50 operates as an AP.

(Variant 8)

In the above embodiments, CS is prioritized over ES in the first selection process (FIG. 6) and the second selection process (FIG. 7) (S151, S153 of FIG. 6, S163, S165 of FIG. 7). Instead, ES may be prioritized over CS.

(Variant 9)

In the above embodiments, in a case where the portable terminal 50 is belonging to a wireless LAN (YES in S33 of FIG. 5), and CS or ES was selected (S152, S154 of FIG. 6), the CPU 72 executes an internet communication via the wireless LAN I/F 60 (S54, S58 of FIG. 4). On the other hand, in a case where the portable terminal 50 is not belonging to a wireless LAN (NO in S33 of FIG. 5), is belonging to a cellular NW (YES in S38), and CS or ES was selected (S164, S166 of FIG. 7), the CPU 72 executes an internet communication via the cellular NW I/F 66 (S56, S58 of FIG. 4). That is, in the above embodiments, internet communication using a wireless LAN, which is not subject to being charged for at a metered rate, is prioritized over internet communication using a cellular NW. Instead, internet communication using a cellular NW may be prioritized over internet communication using a wireless LAN.

(Variant 10)

In the above embodiments, the processes of FIG. 4, FIG. 8, etc. are realized by the CPUs 32, 72 of the MFP 10 and the portable terminal 50 executing programs (i.e., software) within the memories 34, 74. Instead, at least one of the processes may be realized by hardware such as a logic circuit, etc.

What is claimed is:

1. A terminal apparatus comprising:
a processor; and
a memory configured to store an SSID and a BSSID for identifying a first local area network to which the terminal apparatus belongs, the memory further storing computer-readable instructions therein, the computer-readable instructions, when executed by the processor, causing the terminal apparatus to perform:
receiving particular information from a scanner via a near field communication scheme, the particular information including, in a case where the scanner belongs to a second local area network, identification information for identifying the second local area network, the identification information including at least one of an SSID and a BSSID of the second local area network;
determining whether the identification information included in the particular information is stored in the memory of the terminal apparatus;
selecting a direct communication scheme from among a plurality of communication schemes including the direct communication scheme in a case where it is determined that the identification information is stored in the memory of the terminal apparatus, the direct communication scheme being a communication scheme in which the scanner sends scan data not via the internet by using the second local area network;
sending a direct selection result indicating the direct communication scheme and an IP address of the terminal apparatus to the scanner via the near field communication scheme in a case where the direct communication scheme is selected, the IP address of the terminal apparatus being used by the scanner to send particular scan data to the terminal apparatus according to the direct communication scheme via the second local area network which is identical to the first local area network;
receiving, in response to sending the direct selection result to the scanner, the particular scan data from the scanner according to the direct communication scheme via the first local area network which is identical to the second local area network;
determining, in a case where it is determined that the identification information is not stored in the memory of the terminal apparatus, whether the particular information indicates that the scanner is configured to be capable of using a cloud communication scheme, the cloud communication scheme being a communication scheme in which the scanner sends scan data via the internet to a cloud server;
selecting the cloud communication scheme from among the plurality of communication schemes including the cloud communication scheme in a case where it is determined that the particular information indicates that the scanner is configured to be capable of using the cloud communication scheme;
sending a cloud selection result indicating the cloud communication scheme and location information of the cloud server to the scanner via the near field communication scheme in a case where the cloud communication scheme is selected, the location information being used by the scanner to send the particular scan data to the cloud server according to the cloud communication scheme via the internet;
determining, in a case where it is determined that the particular information indicates that the scanner is configured not to be capable of using the cloud communication scheme, whether the particular information indicates that the scanner is configured to be capable of using an electronic mail communication scheme, the electronic mail communication scheme being a communication scheme in which the scanner sends an e-mail including scan data via the internet;
selecting the electronic mail communication scheme from among the plurality of communication schemes including the electronic mail communication scheme in a case where it is determined that the particular information indicates that the scanner is configured to be capable of using the electronic mail communication scheme;
sending an electronic mail selection result indicating the electronic mail communication scheme and an electronic mail address to the scanner via the near field communication scheme in a case where the electronic mail communication scheme is selected, the electronic mail address being used by the scanner to send a particular e-mail including the particular scan data according to the electronic mail communication scheme via the internet.

2. The terminal apparatus as in claim 1, wherein:
in a case where first communication setting information for a communication via the internet is stored in the scanner, the particular information indicates that the scanner is configured to be capable of using the cloud communication scheme, and
in a case where the first communication setting information is not stored in the scanner, the particular information indicates that the scanner is configured not to be capable of using the cloud communication scheme.

3. The terminal apparatus as in claim 1, wherein:
in a case where the scanner receives a response after sending a signal to a server on the internet, the particular information indicates that the scanner is configured to be capable of using the cloud communication scheme, and
in a case where the scanner does not receive the response despite sending the signal to the server, the particular information indicates that the scanner is configured not to be capable of using the cloud communication scheme.

4. The terminal apparatus as in claim 1, wherein:
in a case where the particular information indicates that the scanner is configured to be capable of using the direct communication scheme, the particular information includes the identification information.

5. A scanner comprising:
a processor; and
a memory configured to store an SSID and a BSSID of a second local area network to which the scanner belongs, the memory further storing computer-readable instructions therein, the computer-readable instructions, when executed by the processor, causing the scanner to perform:
receiving, from a terminal apparatus via a near field communication scheme, an instruction to execute a scan function and belonging information indicating whether the terminal apparatus belongs to a first local area network, the belonging information including, in a case where the terminal apparatus belongs to the first local area network, identification information for identifying the first local area network, the identification information including at least one of an SSID and a BSSID of the first local area network;
determining whether the identification information included in the belonging information is stored in the memory of the scanner;
selecting a direct communication scheme from among a plurality of communication schemes including the direct communication scheme in a case where it is determined that the identification information is stored in the memory of the scanner, the direct communication scheme being a communication scheme in which the scanner sends scan data not via the internet by using the second local area network;
sending a direct selection result indicating the direct communication scheme to the terminal apparatus via the near field communication scheme in a case where the direct communication scheme is selected;
receiving an IP address of the terminal apparatus from the terminal apparatus via the near field communication scheme in response to sending the direct selection result;
sending particular scan data to the terminal apparatus via the second local area network, which is identical to the first local area network, according to the direct communication scheme by using the IP address of the terminal apparatus;
determining, in a case where it is determined that the identification information is not stored in the memory of the scanner, whether the scanner is configured to be capable of using a cloud communication scheme, the cloud communication scheme being a communication scheme in which the scanner sends scan data to a cloud server via the internet;
selecting the cloud communication scheme from among the plurality of communication schemes including the cloud communication scheme in a case where it is determined that the scanner is configured to be capable of using the cloud communication scheme;
sending a cloud selection result indicating the cloud communication scheme to the terminal apparatus via the near field communication scheme in a case where the cloud communication scheme is selected;
receiving location information of the cloud server from the terminal apparatus via the near field communication scheme in response to sending the cloud selection result to the terminal apparatus;
sending the particular scan data to the cloud server by using the location information of the cloud server via the internet according to the cloud communication scheme;
determining, in a case where it is determined that the scanner is configured not to be capable of using the cloud communication scheme, whether the scanner is configured to be capable of using an electronic mail communication scheme, the electronic mail communication scheme being a communication scheme in which the scanner sends an e-mail including scan data via the internet;
selecting the electronic mail communication scheme from among the plurality of communication schemes including the electronic mail communication scheme in a case where it is determined that the scanner is configured to be capable of using the electronic mail communication scheme;
sending an electronic mail selection result indicating the electronic mail communication scheme to the terminal apparatus via the near field communication scheme in a case where the electronic mail communication scheme is selected;
receiving an electronic mail address from the terminal apparatus via the near field communication scheme in response to sending the electronic mail selection result to the terminal apparatus; and
sending a particular e-mail including the particular scan data by using the electronic mail address according to the electronic mail communication scheme via the internet.

6. The scanner as in claim 5, wherein:
it is determined that the scanner is configured to be capable of using the cloud communication scheme in a case where first communication setting information for a communication via the internet is stored in the memory of the scanner; and
it is determined that the scanner is configured not to be capable of using the cloud communication scheme in a case where the first communication setting information is not stored in the memory of the scanner.

7. The scanner as in claim 5, wherein:
it is determined that the scanner is configured to be capable of using the cloud communication scheme in a case where the scanner sends a signal to a server on the internet and receives a response; and it is determined that the scanner is configured not to be capable of using the cloud communication scheme in a case of not receiving the response despite sending the signal to the server.

8. A non-transitory computer-readable storage medium storing computer-readable instructions for a terminal apparatus that includes: (a) a processor, and (b) a memory configured to store an SSID and a BSSID of a first local area network to which the terminal apparatus belongs, wherein the computer-readable instructions, when executed by a processor of the terminal apparatus, cause the terminal apparatus to perform:

receiving particular information from a scanner via a near field communication scheme, the particular information including, in a case where the scanner belongs to a second local area network, identification information for identifying the second local area network, the identification information including at least one of an SSID and a BSSID of the second local area network;

determining whether the identification information included in the particular information is stored in the memory of the terminal apparatus;

selecting a direct communication scheme from among a plurality of communication schemes including the direct communication scheme in a case where it is determined that the identification information is stored in the memory of the terminal apparatus, the direct communication scheme being a communication scheme in which the scanner sends scan data not via the internet by using the second local area network;

sending a direct selection result indicating the direct communication scheme and an IP address of the terminal apparatus to the scanner via the near field communication scheme in a case where the direct communication scheme is selected, the IP address of the terminal apparatus being used by the scanner to send particular scan data to the terminal apparatus according to the direct communication scheme via the second local area network which is identical to the first local area network;

receiving, in response to sending the direct selection result to the scanner, the particular scan data from the scanner according to the direct communication scheme via the first local area network which is identical to the second local area network;

determining, in a case where it is determined that the identification information is not stored in the memory of the terminal apparatus, whether the particular information indicates that the scanner is configured to be capable of using a cloud communication scheme, the cloud communication scheme being a communication scheme in which the scanner sends scan data via the internet to a cloud server;

selecting the cloud communication scheme from among the plurality of communication schemes including the cloud communication scheme in a case where it is determined that the particular information indicates that the scanner is configured to be capable of using the cloud communication scheme;

sending a cloud selection result indicating the cloud communication scheme and location information of the cloud server to the scanner via the near field communication scheme in a case where the cloud communication scheme is selected, the location information being used by the scanner to send the particular scan data to the cloud server according to the cloud communication scheme via the internet;

determining, in a case where it is determined that the particular information indicates that the scanner is configured not to be capable of using the cloud communication scheme, whether the particular information indicates that the scanner is configured to be capable of using an electronic mail communication scheme, the electronic mail communication scheme being a communication scheme in which the scanner sends an e-mail including scan data via the internet;

selecting the electronic mail communication scheme from among the plurality of communication schemes including the electronic mail communication scheme in a case where it is determined that the particular information indicates that the scanner is configured to be capable of using the electronic mail communication scheme;

sending an electronic mail selection result indicating the electronic mail communication scheme and an electronic mail address to the scanner via the near field communication scheme in a case where the electronic mail communication scheme is selected, the electronic mail address being used by the scanner to send a particular e-mail including the particular scan data according to the electronic mail communication scheme via the internet.

* * * * *